US006011885A

United States Patent [19]
Dempewolf et al.

[11] Patent Number: 6,011,885
[45] Date of Patent: Jan. 4, 2000

[54] INTEGRATED BI-DIRECTIONAL GRADIENT REFRACTIVE INDEX WAVELENGTH DIVISION MULTIPLEXER

[75] Inventors: Joseph R. Dempewolf, Albuquerque; Robert K. Wade, Edgewood, both of N.Mex.; Robert H. Dueck, Santa Ana, Calif.; Boyd V. Hunter, Albuquerque, N.Mex.; Alan E. Willner, Los Angeles, Calif.

[73] Assignee: LightChip, Inc., Salem, N.H.

[21] Appl. No.: 08/990,198

[22] Filed: Dec. 13, 1997

[51] Int. Cl.[7] .......................................... G02B 6/32
[52] U.S. Cl. .................. 385/34; 385/24; 385/31; 385/33; 385/27
[58] Field of Search .................... 385/34, 15, 24, 385/27, 31, 33, 32, 39

[56] References Cited

U.S. PATENT DOCUMENTS

| | | | |
|---|---|---|---|
| 4,111,524 | 9/1978 | Tomlinson, III | 350/96.19 |
| 4,153,330 | 5/1979 | Tomlinson, III | 350/96.17 |
| 4,198,117 | 4/1980 | Kobayashi | 350/96.19 |
| 4,274,706 | 6/1981 | Tangonan | 350/96.19 |
| 4,279,464 | 7/1981 | Colombini | 350/96.19 |
| 4,299,488 | 11/1981 | Tomlinson, III | 356/328 |
| 4,343,532 | 8/1982 | Palmer | 350/96.19 |
| 4,387,955 | 6/1983 | Ludman et al. | 350/96.19 |
| 4,479,697 | 10/1984 | Kapany et al. | 350/96.18 |
| 4,522,462 | 6/1985 | Large et al. | 350/96.19 |

(List continued on next page.)

OTHER PUBLICATIONS

W.J. Tomlinson, "Wavelength multiplexing in multimode optical fibers", Applied Optics, vol. 16, No. 8, pp. 2180–2194 (Aug. 1977).

A.C. Livanos et al, "Chirped–grating demultiplexers in dielectric waveguides", Applied Physics Letters, vol. 30, No. 10, pp. 519–521 (May 15, 1977).

Hideki Ishio et al, "Review and status of wavelength–division multiplexing technology and its application", Journal of Lightwave Technology, vol. LT–2, No. 4, pp. 448–463 (Aug. 1984).

H. Obara et al, "Star coupler based WDM switch employing tunable devices with reduced tunability range", Electronics Letters, vol. 28, No. 13, pp. 268–270 (Jun. 18, 1992).

(List continued on next page.)

*Primary Examiner*—Phan T. H. Palmer
*Attorney, Agent, or Firm*—Jenkens & Gilchrist, P.C.

[57] ABSTRACT

A wavelength division multiplexer integrating a dispersive element having a gradient refractive index with optical lenses to provide efficient coupling from a plurality of input optical fibers (each delivering a plurality of discrete wavelengths to the device) which are multiplexed to a single polychromatic beam for output to a single output optical fiber. The device comprises: (a) an input means for accepting a plurality of optical input beams of different wavelengths from a plurality of optical sources, the means including a planar front surface onto which the optical beams are incident; (b) a dispersive element comprising a radial (or axial) gradient refractive index for combining the plurality of optical input beams into a single optical beam and operatively associated with the planar front surface; (c) a coupler subsystem secured to the dispersive element and comprising (1) a first homogeneous index boot lens having a planar front surface onto which the single optical beam from the dispersive element is incident, (2) an axial gradient refractive index collimating lens affixed to the first homogeneous index boot lens, and (3) a planar back surface from which the single optical beam exits, operatively associated with the axial gradient refractive index collimating lens; and (d) an output means for outputting at least one multiplexed, polychromatic output beam to an optical receiver, the means including the planar back surface. The device is fully bi-directional and may be operated in the forward direction as a multiplexer and in the reverse direction as a demultiplexer.

51 Claims, 19 Drawing Sheets

U.S. PATENT DOCUMENTS

| | | | |
|---|---|---|---|
| 4,583,820 | 4/1986 | Flamand et al. | 350/96.19 |
| 4,622,662 | 11/1986 | Laude et al. | 370/3 |
| 4,626,069 | 12/1986 | Dammann et al. | 350/162.2 |
| 4,634,215 | 1/1987 | Reule | 350/96.16 |
| 4,643,519 | 2/1987 | Bussard et al. | 350/96.19 |
| 4,652,080 | 3/1987 | Carter et al. | 350/96.19 |
| 4,671,607 | 6/1987 | Laude | 350/96.15 |
| 4,703,472 | 10/1987 | Blumentritt et al. | 370/3 |
| 4,708,425 | 11/1987 | Gouali et al. | 350/96.16 |
| 4,726,645 | 2/1988 | Yamashita et al. | 350/96.18 |
| 4,740,951 | 4/1988 | Lizet et al. | 370/3 |
| 4,741,588 | 5/1988 | Nicia et al. | 350/96.19 |
| 4,744,618 | 5/1988 | Mahlein | 350/96.19 |
| 4,746,186 | 5/1988 | Nicia | 350/96.13 |
| 4,748,614 | 5/1988 | Dammann et al. | 370/3 |
| 4,749,247 | 6/1988 | Large | 350/96.16 |
| 4,752,108 | 6/1988 | Vollmer | 350/96.12 |
| 4,760,569 | 7/1988 | Mahlein | 350/3 |
| 4,763,969 | 8/1988 | Khoe et al. | 350/96.19 |
| 4,773,063 | 9/1988 | Hunsperger et al. | 370/3 |
| 4,786,133 | 11/1988 | Gidon et al. | 350/96.19 |
| 4,819,224 | 4/1989 | Laude | 370/3 |
| 4,834,485 | 5/1989 | Lee | 350/96.19 |
| 4,836,634 | 6/1989 | Laude | 350/96.19 |
| 4,857,726 | 8/1989 | Kinney et al. | 250/226 |
| 4,923,271 | 5/1990 | Henry et al. | 350/96.19 |
| 4,926,412 | 5/1990 | Jannson et al. | 370/3 |
| 4,930,855 | 6/1990 | Clark et al. | 350/96.19 |
| 4,934,784 | 6/1990 | Kapany et al. | 350/96.18 |
| 5,026,131 | 6/1991 | Jannson et al. | 350/3.7 |
| 5,107,359 | 4/1992 | Ohuchida | 359/124 |
| 5,170,451 | 12/1992 | Ohshima | 385/43 |
| 5,228,103 | 7/1993 | Chen et al. | 385/14 |
| 5,278,687 | 1/1994 | Jannson et al. | 359/125 |
| 5,355,237 | 10/1994 | Lang et al. | 359/130 |
| 5,363,220 | 11/1994 | Kuwayama et al. | 359/3 |
| 5,440,416 | 8/1995 | Cohen et al. | 359/127 |
| 5,442,472 | 8/1995 | Skrobko | 359/110 |
| 5,450,510 | 9/1995 | Boord et al. | 385/37 |
| 5,457,573 | 10/1995 | Iida et al. | 359/569 |
| 5,500,910 | 3/1996 | Boudreau et al. | 385/24 |
| 5,513,289 | 4/1996 | Hosokawa et al. | 385/33 |
| 5,526,155 | 6/1996 | Knox et al. | 359/130 |
| 5,541,774 | 7/1996 | Blankenbecler | 359/653 |
| 5,555,334 | 9/1996 | Ohnishi et al. | 385/93 |
| 5,583,683 | 12/1996 | Scobey | 359/127 |
| 5,606,434 | 2/1997 | Feldman et al. | 359/3 |
| 5,657,406 | 8/1997 | Ball | 385/24 |
| 5,703,722 | 12/1997 | Blankenbecler | 359/653 |
| 5,742,416 | 4/1998 | Mizrahi | 359/124 |
| 5,745,270 | 4/1998 | Koch | 359/124 |
| 5,745,271 | 4/1998 | Ford et al. | 359/130 |
| 5,745,612 | 4/1998 | Wang et al. | 385/24 |
| 5,748,350 | 5/1998 | Pan et al. | 359/130 |
| 5,748,815 | 5/1998 | Hamel et al. | 385/37 |
| 5,768,450 | 6/1998 | Bhagavatula | 385/24 |
| 5,777,763 | 7/1998 | Tomlinson, III | 359/130 |

OTHER PUBLICATIONS

A.E. Willner et al, "2–D WDM optical interconnections using multiple–wavelength VCSEL's for simultaneous and reconfigurable communication among many planes", IEEE Photonics Technology Letters, vol. 5, No. 7, pp. 838–841 (Jul. 1993).

Yang–Tung Huang et al, "Wavelength–division–multiplexing and –demeltiplexing by using a substrate–mode grating pair", Optics Letters, vol. 17, No. 22, pp. 1629–1631 (Nov. 15, 1992).

M.R. Wang et al, "Five–channel polymer waveguide wavelength division demultilexer for the near infrared", IEEE Photonics Technology Letters, vol. 3, No. 1, pp. 36–38 (Jan. 1991).

Maggie M. Li et al, "Two–channel surface–normal wavelength division demultiplexer using substrate guided waves in conjunction with multiplexed waveguide holograms", Appl. Phys. Lett. vol. 66, No. 3, pp. 262–264 (Jan. 16, 1995).

G.R. Harrison, Ph.D., Sc.D. et al., Practical Spectroscopy, Chapter 4—Diffraction–Grating Spectrographs, Prentice–Hall (1948) No month.

W.J. Tomlinson et al., Optical multiplexer for multimode fiber transmission systems, Appl. Phys. Lett., vol. 31, No. 3 (Aug. 1977).

W.J. Tomlinson et al., Optical wavelength–division multiplexer for the 1–1.4 µm spectral region, Electronics Letters, vol. 14, No. 11 (May 15, 1973).

T. Miki et al., Viabilities of the wavelength–division–multiplexing transmission system over an optical fiber cable, IEEE Transactions on Communications, vol. Com–26, No. 7 (Jul. 1978).

K. Aoyama et al., Optical demultiplexer for a wavelength division multiplexing system, Applied Optics, vol. 18, No. 8 (Apr. 15, 1979).

K. Aoyama et al., Low–loss optical demultiplexer for WDM systems in the 0.8–µm wavelength region, Applied Optics, vol. 18, No. 16 (Aug. 15, 1979).

R. Watanabe et al., Optical Demultiplexer Using Concave Grating in 0.7–0.9 um Wavelength Region, Electronics Letters, vol. 16, No. 3 (Jan. 31, 1980).

K. Kobayashi et al., Microoptic Grating Multiplexers and Optical Isolators for Fiber–Optic Communications, Journal of Quantum Electronics, vol. QE–16, No. 1 (Jan. 1980).

Yohji et al., Optical Demultiplexer Using a Silison Echelette Grating, Journal of Quantum Electronics, vol. QE–16, No. 2 (Feb. 1980).

W.J. Tomlinson, Applications of GRIN–rod lenses in optical fiber communication systems, Applied Optics, vol. 19, No. 7 (Apr. 1, 1980).

A. Nicia, Wavelength Multiplexing and Demultiplexing Systems for Singlemode and Multimode Fibers, Conference Proceedings, European Conference on Optical Communication (Sep. 8–11, 1981).

B.D. Metcalf et al., High–capacity wavelength demultiplexer with a large–diameter GRIN rod lens, Applied Optics, vol. 21, No. 5 (Mar. 1, 1982).

J. Lipson et al., Low–Loss Wavelength Division Multiplexing (WDM) Devices for Single–Mode Systems, Journal of Lightwave Technology, vol. LT–1, No. 2 (Jun. 1983).

G. Winzer, Wavelength Multiplexing Components—A Review of Single–Mode Devices and their Applications, Journal of Lightwave Technology, vol. LT–2, No. 4 (Aug. 1984).

Y. Fujii et al., Optical Demultiplexer Utilizing an Ebert Mounting Silicon Grating, Journal of Lightwave Technology, vol. LT–2, No. 5 (Oct. 1984).

J. Lipson et al., A Four–Channel Lightwave Subsystem Using Wavelength Division Multiplexing, IEEE Journal of Lightwave Technology, vol. LT–3, No. 1 (Feb. 1985).

B. Hillerich et al., Wide Passband Grating Multiplexer for Multimode Fibers, Journal of Lightwave Technology, vol. LT–3, No. 3 (Jun. 1985).

J. Lipson et al., A Six–Channel Wavelength Multiplexer and Demultiplexer for Single Mode Systems, Journal of Lightwave Technology, vol. LT–3, No. 5 (Oct. 1985).

I. Nishi et al., Broad Passband Multi/Demultiplexer for Multimode Fibers Using a Diffraction Grating and Retroreflectors, Journal of Lightwave Technology, vol. LT–5, No. 12 (Dec. 1987).

B. Moslehi et al., Fiber–optic wavelength–division multiplexing and demultiplexing using volume holographic gratings, Optics Letters, vol. 14, No. 19 (Oct. 1, 1989).

Y. Huang et al., Wavelength–division–multiplexing and –demultiplexing by using a substrate–mode grating pair, Optics Letters, vol. 17, No. 22 (Nov. 15, 1992).

M. Wu et al., Design Considerations for Rowland Circle Gratings Used in Photonic Integrated Devices for WDM Applications, Journal of Lightwave Technology, vol. 12, No. 11 (Nov. 1994).

A. Stavdas et al., Design of a holographic concave grating used as a multiplexer/demultiplexer in dense wavelength–routed optical networks with subnanometer channel spacing, Journal of Modern Optics, vol. 42, No. 9, pp. 1863–1874 (Sep. 1995).

C. Zhou et al., Four Channel Multimode Wavelength Division Demultiplexer (WDM) System Based on Surface–normal Volume Holographic Gratings and Substrate–guided Waves, SPIE, vol. 3288.

A. Stavdas et al., Free–Space Aberration–Corrected Diffraction Grating Demultiplexer for Application in Densely–Spaced, Subnanometer Wavelength Routed Optical Networks, IEEE Electronic Letters, vol. 31, No. 16, pp. 1368–1370 (Aug. 1995).

D. Wisely, High performance 32 channel HDWDM multiplexer with 1nm channel spacing and 0.7nm bandwidth, SPIE, vol. 1578, Fiber Networks for Telephony and CATV (1991).

A. Cohen et al., Active management of 100–GHz–spaced WDM channels, Optical Fiber Communication Conference and the International Conference on Integrated Optics and Optical Fiber Communication, Technical Digest, Conference Edition (Feb. 24, 1999).

B. Keyworth et al., Low Loss, Temperature Stable Diffraction Grating Wavelength (DE) Multiplexer, National Fiber Optic Engineers Conference, Technical Proceedings, vol. I (Sep. 13–17, 1998).

M. Seki et al., 20—Channel Micro–Optic Grating Demultiplexer for 1.1–1.6um Band Using a Small Focusing Parameter Graded–Index Rod Lens, Electronics Letters, vol. 18, No. 6 (Mar. 18, 1982).

A. Koonen, A Compact Wavelength Demultiplexer Using Both Interference Filters and a Diffraction Grating, European Conference of Optical Communication, Conference Proceedings (Sep. 8–11, 1981).

J. Conradi et al., Laser Based WDM Multichannel Video Transmission System, Electronic Letters, vol. 17, No. 2, (Jan. 22, 1981).

J. Laude et al., Wavelength division multiplexing/demultiplexing (WDM) using diffraction gratings, SPIE, vol. 503, Application, Theory, and Fabricationof Periodic Structures (1984).

J. Laude et al., Stimax, A Grating Multiplexer for Monomode or Multimode Fibers, Ninth European Conference on Optical Communication–ECOC83, Geneva, Switzerland (Oct. 23–26, 1983).

INTEGRATED BI-DIRECTIONAL GRADIENT REFRACTIVE INDEX WAVELENGTH DIVISION MULTIPLEXER

CROSS-REFERENCE TO RELATED APPLICATIONS

The present application is related to two other patent applications, the first entitled "Integrated Bi-Directional Dual Axial Gradient Refractive Index/Diffraction Grating Wavelength Division Multiplexer" [PD-97031] and the second entitled "Integrated Bi-Directional Axial Gradient Refractive Index/Diffraction Grating Wave-length Division Multiplexer" [PD-97033], both filed on even date herewith and assigned to the same assignee. This and the two related applications are all directed to wavelength division multiplexers, and differ in the presence or absence of a diffraction grating and the number of gradient refractive index elements.

TECHNICAL FIELD

The present invention relates generally to axial and radial gradient lenses, and, more particularly, to axial and radial gradient index lenses employed in wavelength division multiplexing and related types of applications.

BACKGROUND ART

Wavelength division multiplexing (WDM) is a rapidly emerging technology that enables a very significant increase in the aggregate volume of data that can be transmitted over optical fibers. Traditionally, most optical fibers have been used to unidirectionally carry only a single data channel at one wavelength. The basic concept of WDM is to launch and retrieve multiple data channels in and out, respectively, from an optical fiber. Each data channel is transmitted at a unique wavelength, and the wavelengths are appropriately selected such that the channels do not interfere with each other, and the optical transmission losses of the fiber are low. Today, commercial WDM systems exist that allow transmission of 2 to 32 simultaneous channels.

WDM is a cost-effective method of increasing the volume of data (commonly termed bandwidth) transferred over optical fibers. Alternate competing technologies to increasing bandwidth include the burying of additional fiber optic cable or increasing the transmission speed on optical fiber. The burying of additional fiber optic cable costs on the order of $15,000 to $40,000 per Km. Increasing the optical transmission rate is increasing limited by speed and economy of the electronics surrounding the fiber optic system. One of the primary strategies to electronically increasing bandwidth has been to use time division multiplexing (TDM), which gangs or multiplexes multiple lower rate electronic data channels together into a single very high rate channel. This technology has for the past 20 years been very effective for increasing bandwidth; however, it is now increasingly difficult to improve transmission speeds, both from a technological and economical standpoint. WDM offers the potential of both an economical and technological solution to increasing bandwidth by using many parallel channels. WDM is complimentary to TDM, that is, WDM can allow many simultaneous high transmission rate TDM channels to be passed over a single optical fiber.

The use of WDM to increase bandwidth requires two basic devices that are conceptually symmetrical. The first device is a wavelength division multiplexer. This device takes multiple beams—each with discrete wavelengths and initially spatially separated in space—and provides a means of spatially combining all of the different wavelength beams into a single polychromatic beam suitable for launching into an optical fiber. The multiplexer may be a completely passive optical device or may include electronics that control or monitor the performance of the multiplexer. The input of the multiplexer is typically accomplished with optical fibers; however, laser diodes or other optical sources may be employed. The output of the multiplexer is typically an optical fiber.

Similarly, the second device for WDM is a wavelength division demultiplexer. This device is functionally the opposite of the multiplexer; it receives a polychromatic beam input from an optical fiber and provides a means of spatially separating the wavelengths. The output of the demultiplexer is typically interfaced to optical fibers or to photodetectors.

During the past 20 years, various types of WDMs have been proposed and demonstrated; see, e.g., (1) W. J. Tomlinson, *Applied Optics*, Vol. 16, No. 8, pp. 2180–2194 (August 1977); (2) A. C. Livanos et al, *Applied Physics Letters*, Vol. 30, No. 10, pp. 519–521 (May 15, 1977); (3) H. Ishio et al, *Journal of Lightwave Technology*, Vol. 2, No. 4, pp. 448–463 (August 1984); (4) H. Obara et al, *Electronics Letters*, Vol. 28, No. 13, pp. 1268–1270 (Jun. 18, 1992); (5) A. E. Willner et al, IEEE *Photonics Technology Letters*, Vol. 5, No. 7, pp. 838–841 (July 1993); and (6) Y. T. Huang et al, *Optics Letters*, Vol. 17, No. 22, pp. 1629–1631 (Nov. 15, 1992).

However, despite all of the above approaches, designs, and technologies, there remains a real need for a WDM devices which possesses all the characteristics of: low cost, component integration, environment and thermal stability, low channel crosstalk, low channel signal loss, ease of interfacing, large number of channels, and narrow channel spacing.

DISCLOSURE OF INVENTION

In accordance with the present invention, a wavelength division multiplexer or demultiplexer utilizes both an axial and a radial gradient refractive index element to create an integrated, bi-directional wavelength division multiplexer or demultiplexer device. For simplicity, the multiplexer function will be extensively discussed; however, such discussions of the invention will also be directly applicable to the demultiplexer due to the symmetry of the multiplexer and demultiplexer function. The multiplexer device of the present invention comprises:

(a) an input means for accepting a plurality of optical input beams of different wavelengths from a plurality of optical sources, the means including a planar front surface onto which the optical beam is incident;

(b) a dispersive axial or radial gradient refractive index element for combining the plurality of optical input beams into a single beam and operatively associated with the planar front surface;

(c) a coupler subsystem secured to the dispersive axial or radial gradient refractive index element and comprising (1) a first homogeneous index boot lens having a planar front surface onto which the optical beam from the dispersive element is incident, (2) an axial gradient refractive index collimating lens affixed to the first homogeneous index boot lens, and (3) a planar back surface from which the at least one optical beam exits, operatively associated with the axial gradient refractive index collimating lens; and (d) an output means for outputting at least one multiplexed, polychromatic output beam to an optical receiver, the means including the planar back surface.

The device of the present invention may be operated in either the forward direction to provide a multiplexer function or in the reverse direction to provide a demultiplexer function. Further, the device of the present invention is inherently fully bi-directional and can be used simultaneously as a multiplexer and demultiplexer for network hubs or intersections that distribute channels to various areas of a network.

The present radial and axial gradient refractive index WDM device are unique because they contain one or more homogeneous index boot lenses which allows integration of all the optical components into a single integrated device. This greatly increases the ruggedness, environmental and thermal stability while simultaneously avoiding the introduction of air spaces which cause increased alignment sensitivity, device packaging complexity, and cost.

Additionally, the homogeneous index boot lenses provide large, planar surfaces for device assembly, alignment and the integration of additional device functions. The use of an axial gradient refractive index lens allows very high performance imaging from a lens with traditional spherical surfaces, thereby providing the diffraction-limited optical imaging necessary for WDM applications. Further, axial gradient refractive index lenses are formed with high quality and low cost. Alternately, aspheric shaped lenses could be used in place of axial gradient refractive index lenses; however, the collimating performance is the same, but it is exceedingly difficult to create a one-piece, integrated device with aspheric surfaces. Further, aspherical lenses are typically very costly and suffer from ghosting-types of reflections which are very undesirable.

The integration of the WDM device allows for a compact, robust, and environmentally and thermally stable system. In particular, integration of the components into a solid block maintains component alignment, which provides long-term performance in contrast to non-integrated air-spaced devices that characteristically degrade in alignment and therefore performance over time.

Overall, the present invention features a novel approach to WDM. The use of optical lenses in conjunction with a dispersive element having a gradient refractive index allows all wavelengths to be multiplexed simultaneously and treated uniformly. This is contrast to the less desirable serial WDM approaches that use interference filter-based or fiber Bragg gratings. Such serial WDM approaches suffer from significant optical loss, crosstalk, alignment, and temperature issues. Further, compared to other parallel multiplexing approaches such as array waveguide grating devices, fused fiber couplers, or tree waveguide couplers, the present invention performs the wavelength separation freely inside glass as opposed to inside of lossy waveguiding structures. Thus, the present invention has the distinct advantages of lower optical signal loss through the device and ease of assembly and alignment compared to the current art.

Other objects, features, and advantages of the present invention will become apparent upon consideration of the following detailed descriptions and accompanying drawings, in which like reference designations represent like features throughout the FIGURES. It will be apparent to one skilled in the art that additional objects, features, and advantages not expressly discussed here are inherent to and follow from the spirit of this invention.

BRIEF DESCRIPTION OF THE DRAWINGS

The drawings referred to in this description should be understood as not being drawn to scale except if specifically noted.

BEST MODES FOR CARRYING OUT THE INVENTION

Reference is now made in detail to specific embodiments of the present invention, which illustrate the best modes presently contemplated by the inventors for practicing the invention. Alternative embodiments are also briefly described as applicable.

Figure 1:
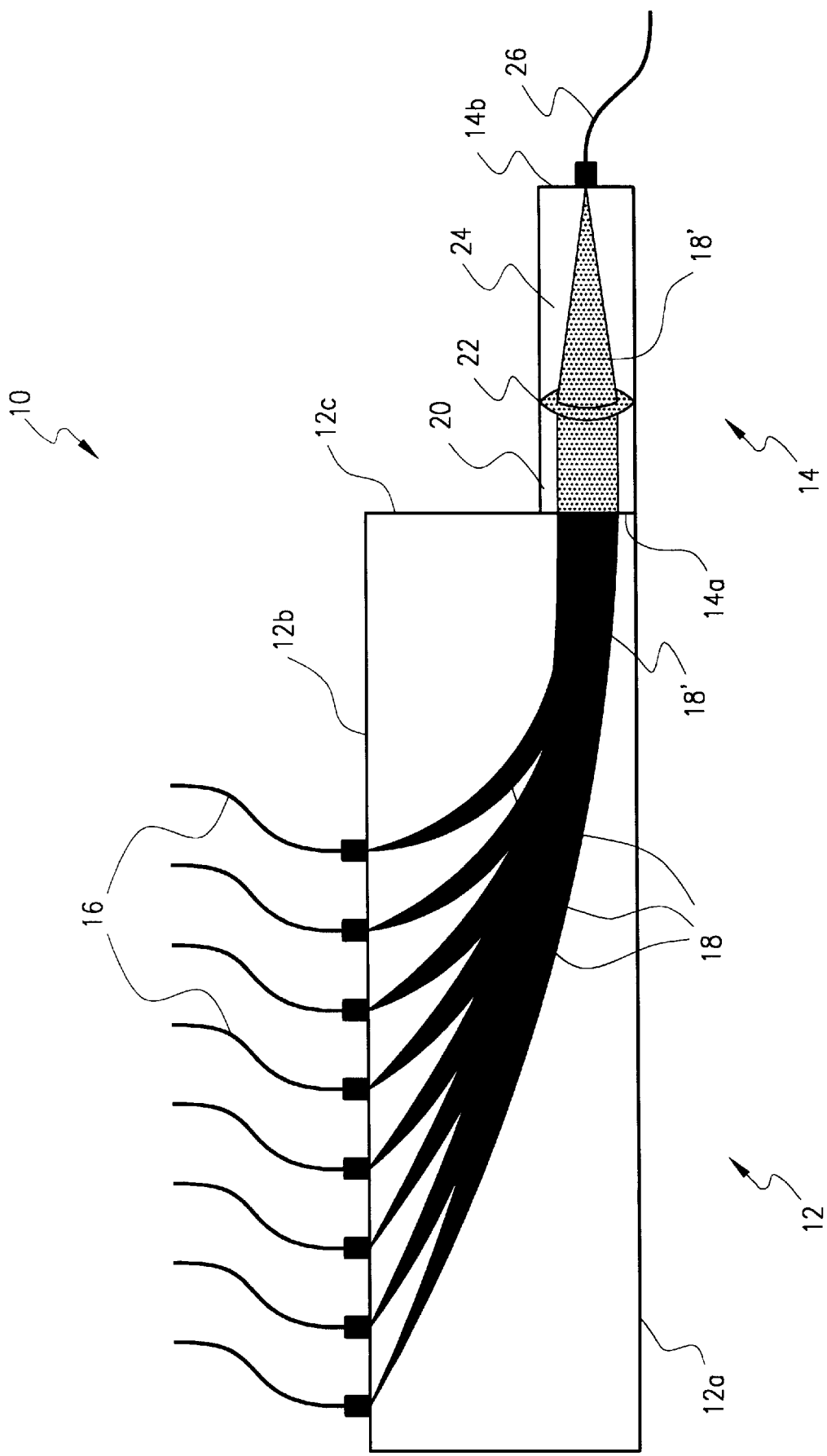
FIG. 1 is a side elevational view, in schematic, of a wavelength division multiplexer device of the present invention, with an axial gradient refractive index dispersive element, or first coupler element, as a collimated lens and an axial gradient focusing lens, as part of the second coupler element, and multiple optical fiber inputs multiplexed to one optical fiber output, it being noted that the device may be operated in the reverse direction as a wavelength division demultiplexer, with a single optical fiber input demultiplexed to an array of optical fibers.

FIG. 1 depicts an embodiment of the present invention, employing axial gradient refractive index elements for use in a wavelength division multiplexer device.

Figure 1C:
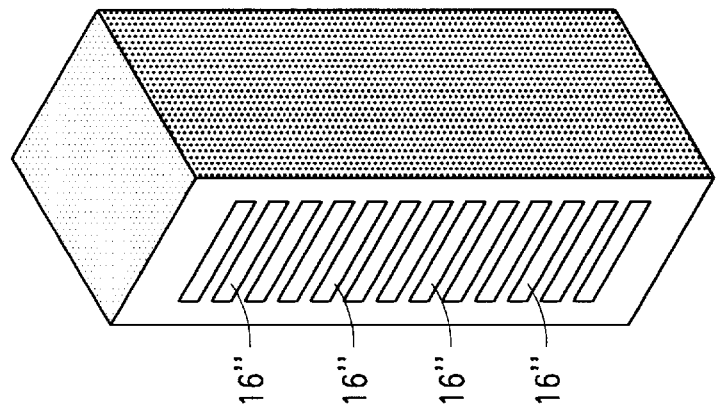
FIG. 1c is a perspective view of the output portion of the device of FIG. 1 and illustrates an alternate output configuration for a demultiplexer device in which the output is an array of photodetectors.

The device 10 comprises a first coupler element 12 and a second coupler element 14. The first coupler element 12 comprises an axial gradient refractive index element, in which the gradient traverses from low index at surface 12a to high index at surface 12b. The axial gradient refractive index element 12 is iispersive, and serves to combine different wavelengths of light when the light is traveling from the high index surface 12b toward the low index surface 12a, or to separate a plurality of wavelengths on a single beam when the light is traveling in the reverse direction. In an alternative, and preferred, embodiment, the first coupler element 12 comprises a radial gradient refractive index element, again, in which the gradient traverses from low index (e.g., "1.50") at surface 12a to high index (e.g., "1.85") at surface 12b, as shown in FIG. 1a. The region of highest refractive index corresponds to the optical axis of the dispersive element 12. Further, the optical axis of the dispersive element 12 is parallel and in-line with the optical axis of the second coupler element 14. It is wellknown in the art that the preferred radial refractive index profile is predominantly a parabolic function for refractive index versus radial position.

In the embodiment employing an axial refractive index gradient in place of the radial refractive index gradient in dispersive element 12, the optical axis of the axial refractive index gradient would pass through and be normal to both surfaces 12a and 12b. The use of an axial refractive index gradient is preferable under certain conditions where the number of WDM channels, device size, or device length can not be achieved using a radial gradient.

It would be obvious to one skilled in the art that the use of an axial refractive index gradient in dispersive element 12 precludes focusing or diverging of light in an axis normal to the axial gradient and also normal to the optical axis of the second coupler 14. Therefore, additional elements are typically necessary to operate on this otherwise uncorrected axis. Numerous examples of additional elements are given in the other embodiments below. It will be appreciated that while an axial gradient is depicted for the dispersive element 12 in many of the drawings, in fact, a radial gradient may alternatively be employed in such drawings.

An array of optical fibers 16 is positioned so that light emanating from the end the optical fibers are incident along the line of the highest refractive index on the entrance surface 12b of the first coupler element 12. Each fiber 16 provides a light beam 18 with a separate and discrete wavelength. As the light beams 18 travel from the high refractive index region 12b toward the low refractive index region 12a, they are first bent and collimated by the change in index of refraction, then combined into a single beam 18', and finally directed toward exit surface 12c.

The second coupler element 14 comprises a first homogeneous index boot lens 20 joined or affixed to an axial gradient refractive index collimating lens 22; joining is conveniently achieved using optical cement, for example. The axial gradient refractive index lens 22 is joined or affixed to a second homogeneous index boot lens 24, also using an optical cement.

The combined and collimated light beam 18' enters the first homogeneous index boot lens 20. Subsequently, the combined light beam 18' enters the axial gradient refractive index lens 22, where it is focused and then passed through the second homogeneous index boot lens 24. The single focused beam 18' is then incident on the output face 14b of the device where an optical fiber 26, attached thereto, accepts the combined light beam for further transmission.

As a multiplexer, the device 10 of the first embodiment takes an input fiber array 16 of N discrete wavelengths of light and spatially combines them into a single fiber output 26. Each wavelength is transmitting information superimposed on it by other means, which are not shown here and which do not form a part of this invention, but are well known in this art.

Figure 1B:
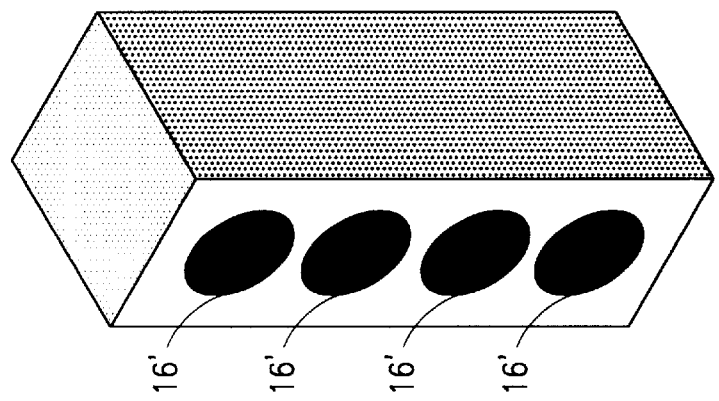
FIG. 1b is a plan view of the input portion of the device of FIG. 1 and illustrates an alternate input configuration in which the input is a linear array of laser diodes.
Figure 1A:
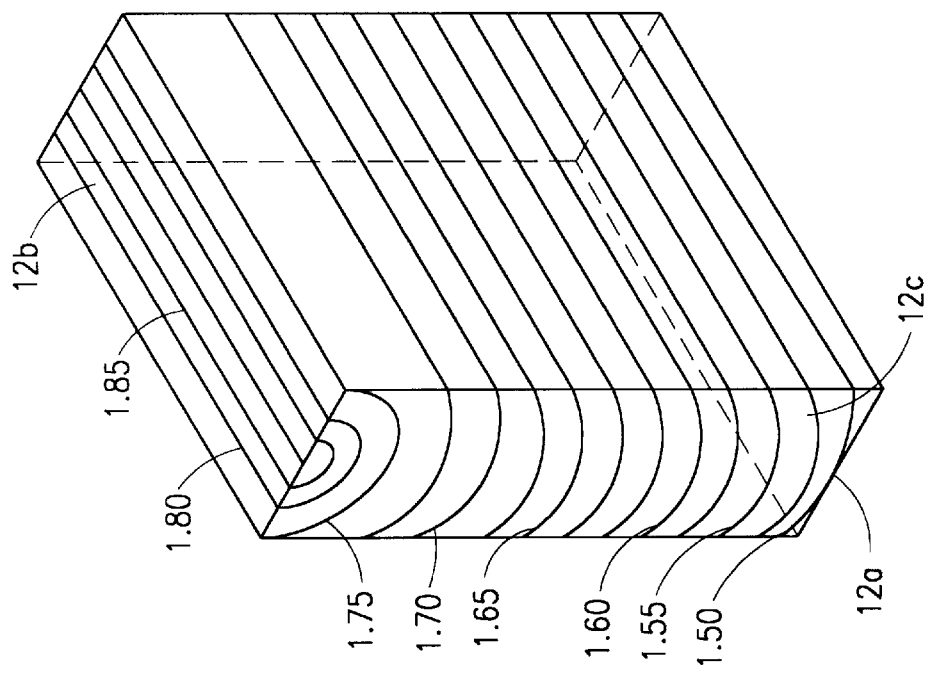
FIG. 1a is a perspective view of a portion of the dispersive element, in which a radial refractive index profile is shown as iso-index lines.

In the embodiment depicted in FIG. 1, a plurality of laser diodes 16', shown in FIG. 1b, may be used in place of a plurality of optical fibers 16 to provide optical beam inputs 18 for the wavelength division multiplexer. The array of laser diodes 16' may either be butt-coupled to first coupler 12 of the WDM device 10, may be longitudinally separated from the device, or may have appropriate focusing lenses placed between the array 16' and the entrance surface 12b to provide the best coupling and the lowest amount of signal loss or crosstalk.

In the second embodiment, the device 10 shown in FIG. 1, as with all of the devices described herein, may be operated in the converse configuration, with a single optical fiber input 26 that introduces a single polychromatic light beam 18' carrying multiple discrete wavelength channels.

The channels are spatially separated by the demultiplexing function 12 of the device 10 for output to a plurality of optical fibers 16. Each output fiber 16 carries only a single and discrete wavelength channel. Functionally, in this embodiment, the demultiplexer provides an identical but opposite function to the multiplexer device.

The combined light beam 18', containing a plurality of different wavelengths, is input into the second coupler 14 from optical fiber 26. In the second homogeneous index boot lens 24, the combined light beam 18' expands and as it passes through the axial gradient refractive index of refraction lens 22, it is collimated. Then, after passing through the first homogeneous index boot lens 20, it enters the axial gradient refractive index element 12, where the combined light beam 18' is angularly and spatially separated into a plurality of light beams 18, which are directed to separate optical fibers 16.

In the demultiplexer embodiment of FIG. 1, a plurality of photodetectors 16", shown in FIG. 1c, may be used in place of a plurality of optical fibers; 16 as an optical receiver for the wavelength division demultiplexer. The array of photodetectors 16" may either be butt-coupled to the WDM device 10, may be longitudinally separated, or may have appropriate focusing lenses placed between the array 16" and the high index surface 12b to provide the lowest amount of signal loss or crosstalk.

Figure 2:
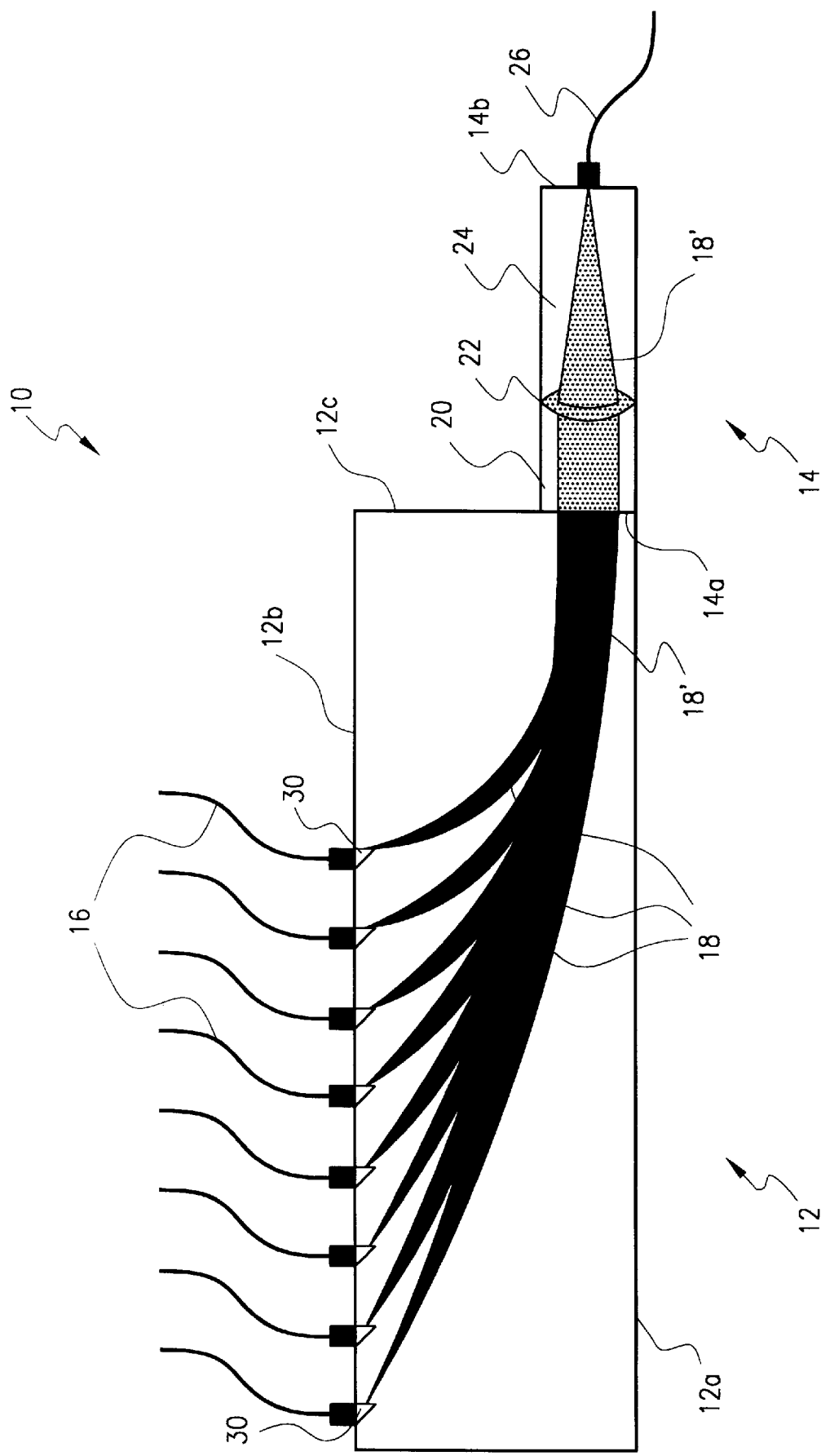
FIG. 2 is a view similar to that of the device of FIG. 1, but incorporating a plurality of notches in the dispersive element to improve coupling efficiency of the device.

In a third embodiment, shown in FIG. 2, the wavelength division multiplexer 10 is provided with an array of notches along the top surface 12b for the purpose of deflecting the incident light beams 18 toward the output face 12c of the first coupler element 12. The notches 30 may be simply triangular in shape that are machined into the first coupler element 12; however, more complex notch shapes may be more desirable to best direct the light 18 in the proper direction. One or more anti-reflection coatings (not shown) may be used in the notches 30 to reduce back reflections and signal loss. The notches 30 are preferably filled with air; however, it may be necessary to improve performance by filling the notches with an optical polymer or glass material. Each notch 30 typically has the same shape and dimensions, preferably with that part of the notch away from the output face 12c at an angle and that part of the notch closer to the output face normal to the high index surface 12b. Each notch may have a unique notch angle, size, or fill material to improve performance of that individual input.

When the device 10 is operated in the multiplexer mode, the notches 30 provide improved coupling of the light beams 18 from the plurality of optical fibers 16 into the axial gradient refractive index element 12. When operated in the demultiplexer mode, the notches 30 provide improved coupling of the light beams from the axial gradient refractive index element 12 into the plurality of optical fibers 16. An alternate embodiment would be to input the optical fibers (not shown) to essentially the same angle as the notches 30. This is not preferred because of the complexity of attaching the input fibers at a non-normal angle to the dispersive element 12.

Figure 3:
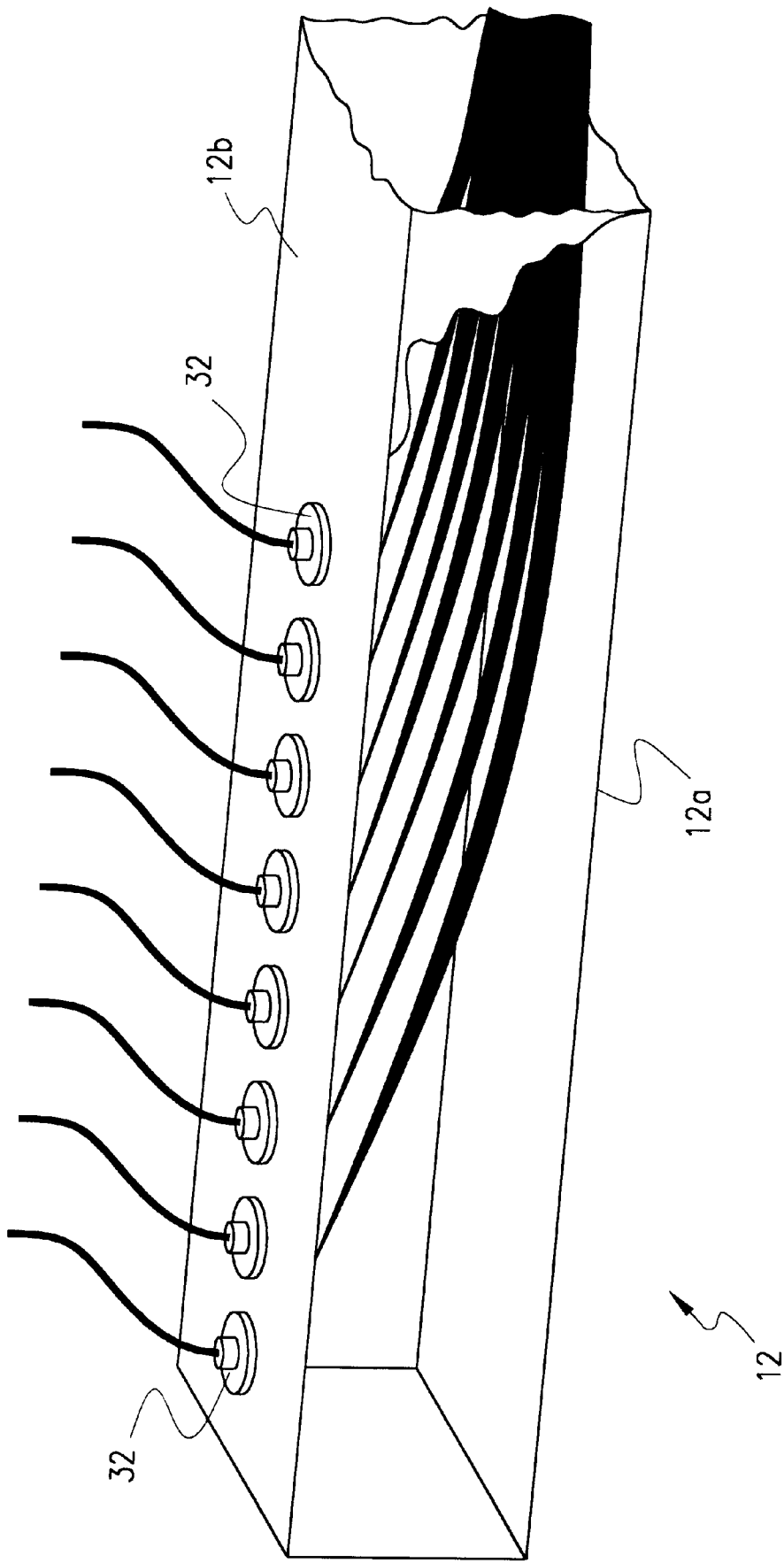
FIG. 3 is a perspective view of the input portion of the device of FIG. 1, but incorporating a suitable array of enses between the input fiber array and the first coupler element to improve coupling efficiency of the device.

In a fourth embodiment, shown in FIG. 3, the wavelength division multiplexer 10 is provided with an array of lenses 32 between the input fiber array 16 and the first coupler element 12 to improve coupling efficiency. The lens array consists of a one-dimensional array of discrete lenses 32 that can be used for directing and focusing the light beams 18 towards the output surface 12c of the first coupler element 12. The lens array 32 may consist of an array of microlenses or cylindrical, aspherical, elliptical, spherical, diffractive, or other type of lens structures to transform the incident light beams 18. As above, the multiplexer 10 with lenses 32 may be operated in the reverse direction as a demultiplexer device. The use of a lens array can allow the use of an axial refractive gradient in dispersive element 12. In this embodiment, the optical axis of the axial gradient dispersive element 12 is normal to both the top 12b and the bottom 12a surfaces of element 12.

Figure 4:
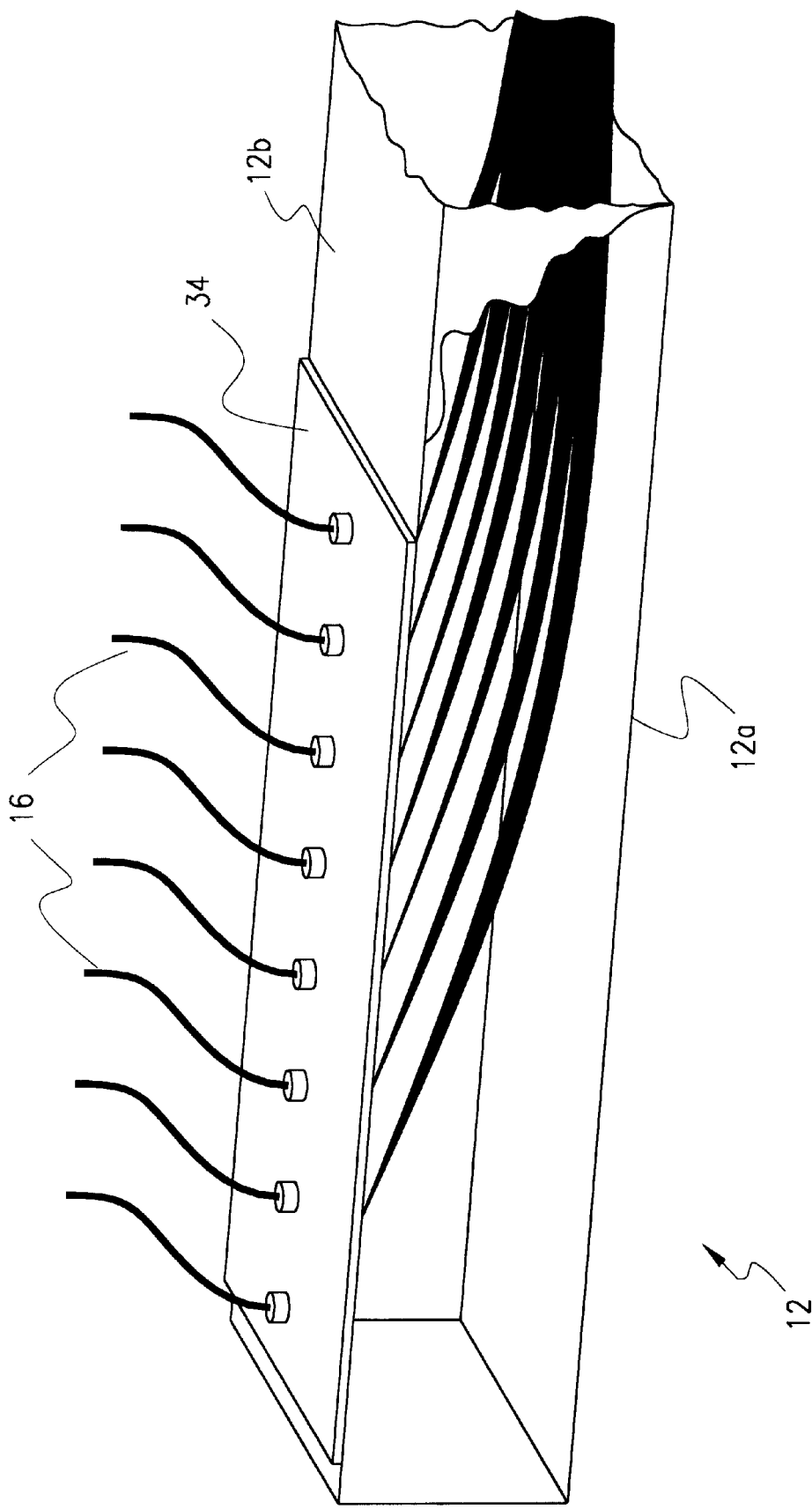
FIG. 4 is a perspective view of the input portion of the device of FIG. 1, but incorporating a cylindrical gradient refractive index lens between the array of input fibers and the first coupling element.

In a fifth embodiment, depicted in FIG. 4, the wavelength division multiplexer 10 is provided with a cylindrical gradient refractive index lens 34 to input the one-dimensional array of optical fibers 16 into the high index surface 12b of the first coupler 12. The cylindrical gradient refractive index lens 34, which has been disclosed elsewhere (see, e.g., U.S. Pat. No. 5,689,374, issued Nov. 18, 1997), serves to eliminate divergence of the input light 18; instead, the light is focused in one axis by the cylindrical gradient refractive index lens. The use of a cylindrical gradient refractive index can allow the use of an axial refractive index gradient in dispersive element 12. In this embodiment, the optical axis of the cylindrical refractive index lens 34 is normal to both the direction of the fiber array 16 and to the optical inputs 18.

Figure 5:
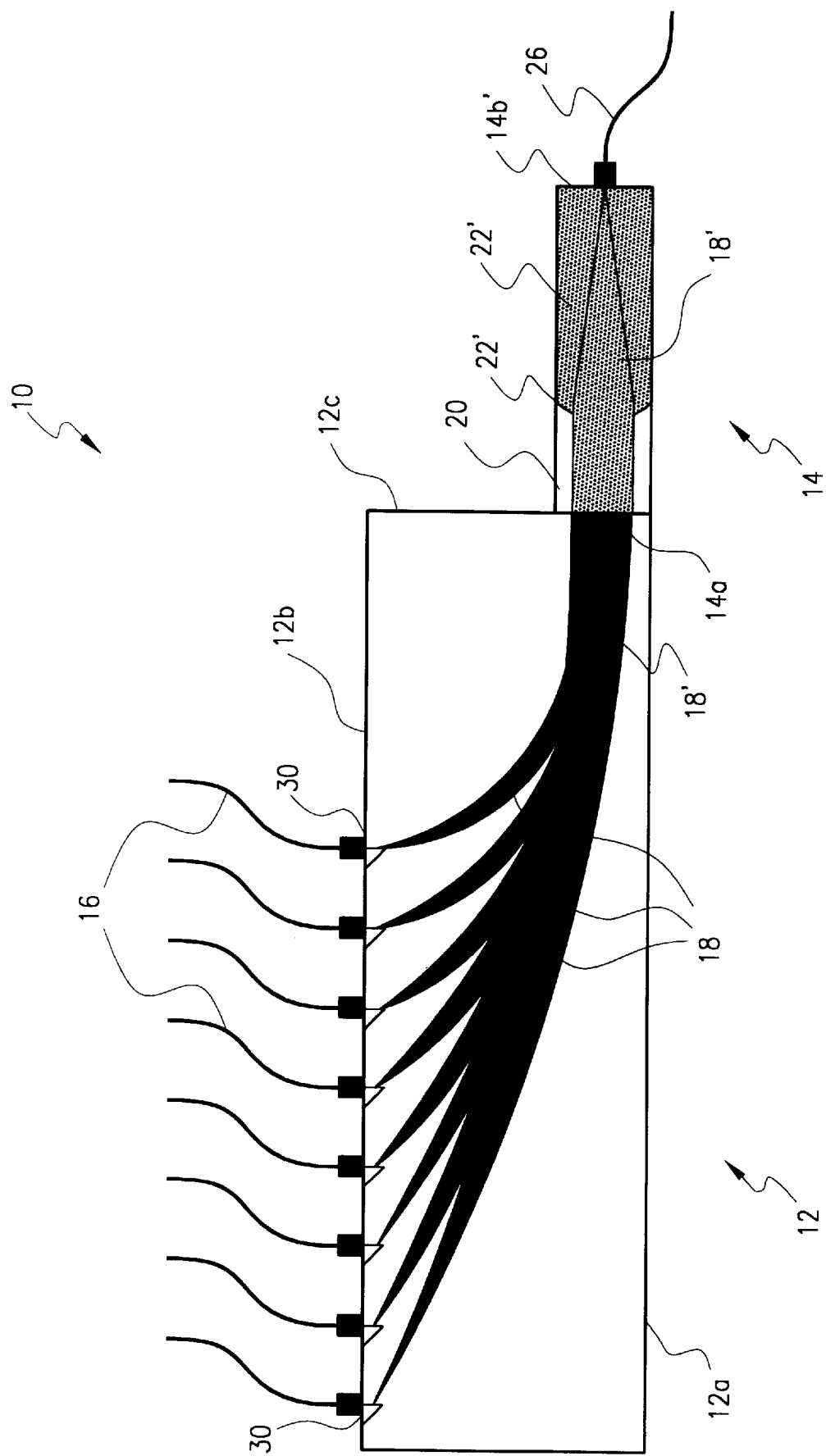
FIG. 5 is a view similar to that of the device of FIG. 1, but does not include a homogeneous index boot lens element between the input and the axial gradient index collimating lens.

In a sixth embodiment, depicted in FIG. 5, the second homogeneous index boot lens 24 in FIG. 1 is removed to create a more compact device or for multiplexing devices where the use of the homogeneous index boot lens is not necessary for performance. In this embodiment, the radial gradient refractive index element 12 possesses a planar entrance face 12b for directly connecting to a plurality of optical fibers 16 or laser diodes 16', as in FIG. 1, and the axial gradient refractive index lens 22' possesses a planar exit face 14b' for directly connecting to a single output fiber 26. An alternate implementation (not shown) of this sixth embodiment would be to incorporate an air space between the radial gradient refractive index element and the axial gradient refractive index lens. The introduction of air space is not a preferred embodiment, as it increases the complexity of assembly and alignment of the multiplexer device and would be subject to greater environmental and temperature instability versus the integrated block approach of the previous embodiments. All elements are secured together with the use of optical cement.

Figure 6:
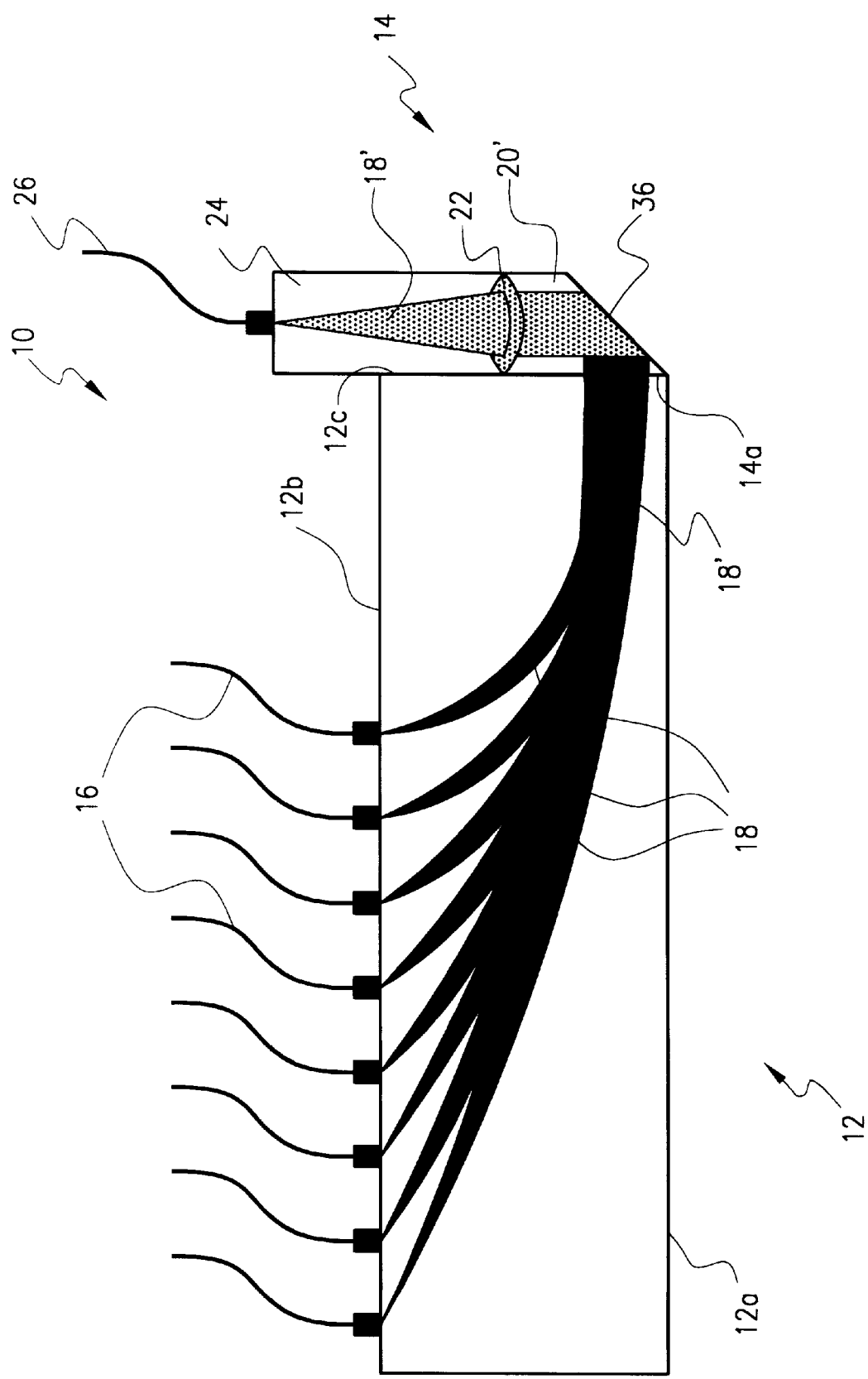
FIG. 6 is a view similar to that of the device of FIG. 1, but containing a beveled mirror in the homogeneous boot lens of the second coupler in order to fold the device into a smaller space.

In the seventh embodiment, shown in FIG. 6, the wavelength division multiplexer is provided with a −45° angle beveled into the first homogeneous index boot lens 20' of the second coupler element 14. The −45° angle bevel 36 is mirrored in order to reflect the light beam 18 at a 270° angle inside of the second coupler element 14, thereby creating an "L" shaped device. The mirrored surface 36 allows folding of the device 10 into a smaller footprint than the device of FIG. 1. It is also possible to modify the first homogeneous index boot lens 20' with additional mirrors (not shown) to create a wavelength division multiplexer device in which the second coupler element 14 is located beneath the first coupler element 12, along surface 12a.

Figure 7:
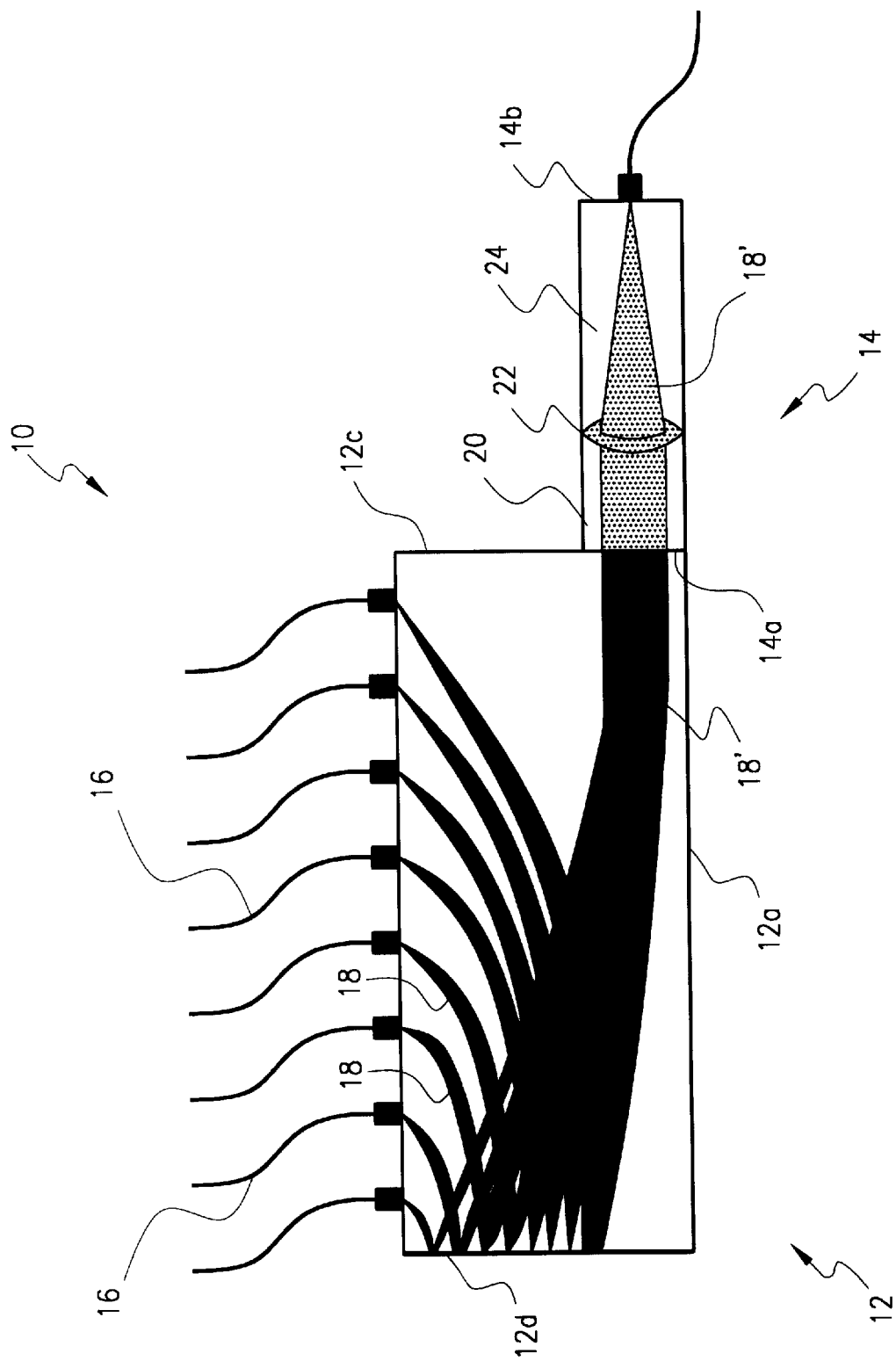
FIG. 7 is a view similar to that of the device of FIG. 1, but containing a mirrored surface on the side of the first coupler element opposite of the second coupler element, in order to provide a device in which the optical path is folded in the first coupler to thereby reduce the size of the device.

In the eight embodiment, depicted in FIG. 7, the wavelength division mulitplexer is provided with a mirrored surface 12d on one or more sides of the first coupler element 12 in order to reduce the length of the element. With each reflection, the length of the element is reduced. The folding of the first coupler element 12 is desirable due to the large size of the unfolded element relative to the rest of the device.

Figure 8:
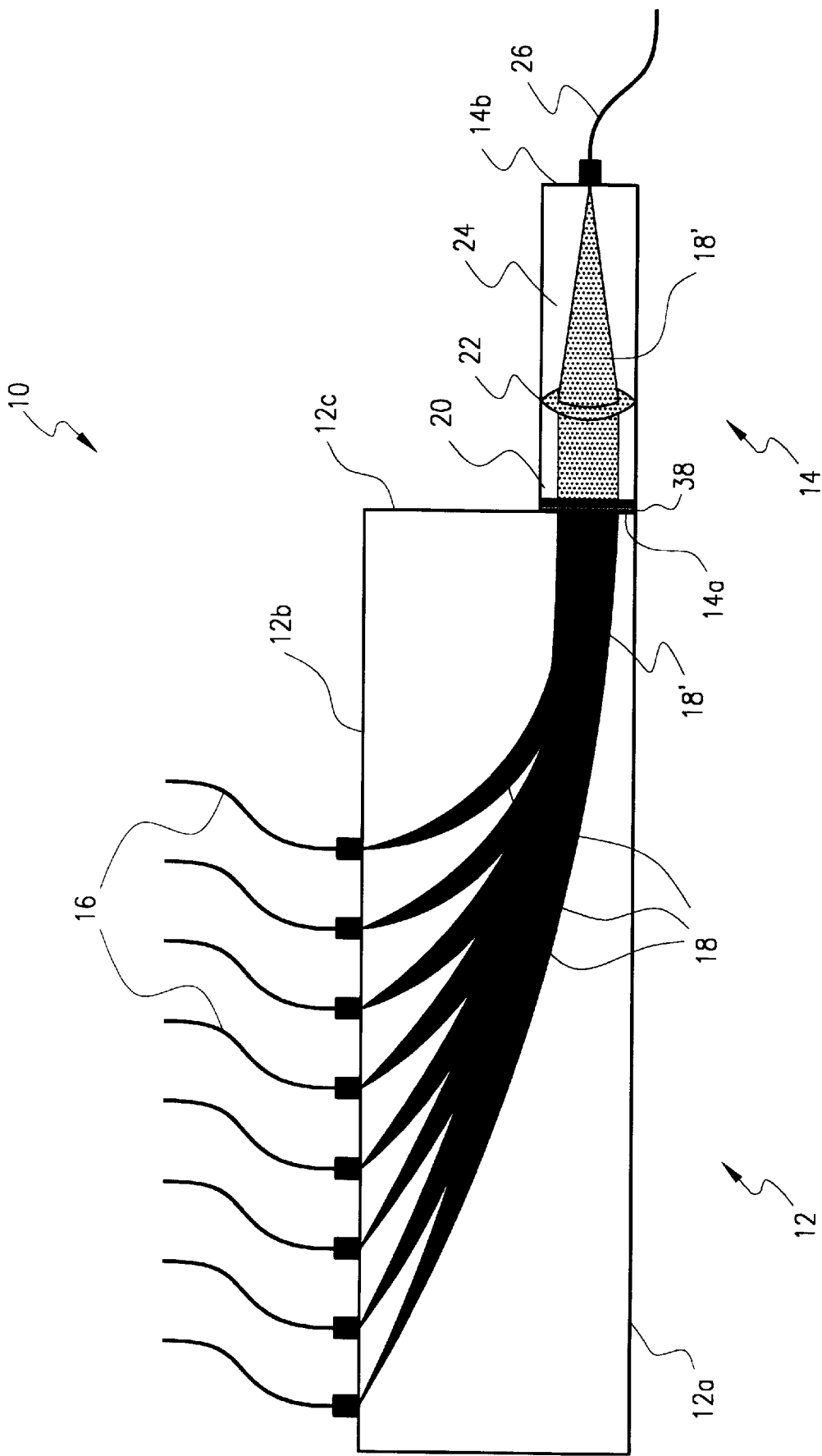
FIG. 8 is a view similar to that of the device of FIG. 1, but containing an electrooptical beamsteering element between the dispersive element and the second homogeneous index boot lens to provide a channel routing function by shifting the position of the output beam at the output face of the device.

In the ninth embodiment, depicted in FIG. 8, a non-linear electrooptic element 38 is inserted between the first coupler element 12 and the second coupler element 14. The non-linear electrooptic device 38 provides a capability for selectively routing the multiplexed light 18 into one of several possible colinear fiber outputs 26 (one of which is visible in FIG. 8, the other fiber outputs being behind the visible output). This design is exceedingly valuable for optical networking, where the wavelength division multiplexer device 10 can provide simultaneous integrated multiplexing and routing functions. The electrooptic element 38 is an electrically controlled solid state optical material in which the refractive index can be modified by varying the electrical current applied to the material. Such electrooptic elements 38, such as comprising lithium niobate and certain polymers, are well-known in the art.

The change in refractive index is used to increase of decrease the angle or light propagation (relative to the gradient direction of the electrooptical material). At the output face 14b of the device 10, the deflection angle is transformed into a spatially collinear deflection of the beams 18'. It is very desirable to use the electrooptic element 38 to shift the position of the light beam output 18' to more than one output fiber 26. As shown in FIG. 8, the electrooptical element 38 is used to direct the output to one of a plurality of possible fiber outputs 26. The output optical fibers 26 are collinear.

An alternate embodiment would use the device 10 in the reverse direction to create a demultiplexing and routing device. In this alternate embodiment, the demultiplexed outputs may be routed to one of many possible output arrays of fibers 16 (one of which is visible in FIG. 8, the other output arrays being behind the visible output). Alternately, the demultiplexed outputs may be routed to one of many possible arrays of photodetectors (not shown). The resulting output array (whether optical fibers or photodetectors) is a two-dimensional array, as opposed to the one-dimensional array of FIG. 1c. This configuration saves in the cost and size by integrating the demultiplexing (or multiplexing) function together with a routing function.

Figure 9:
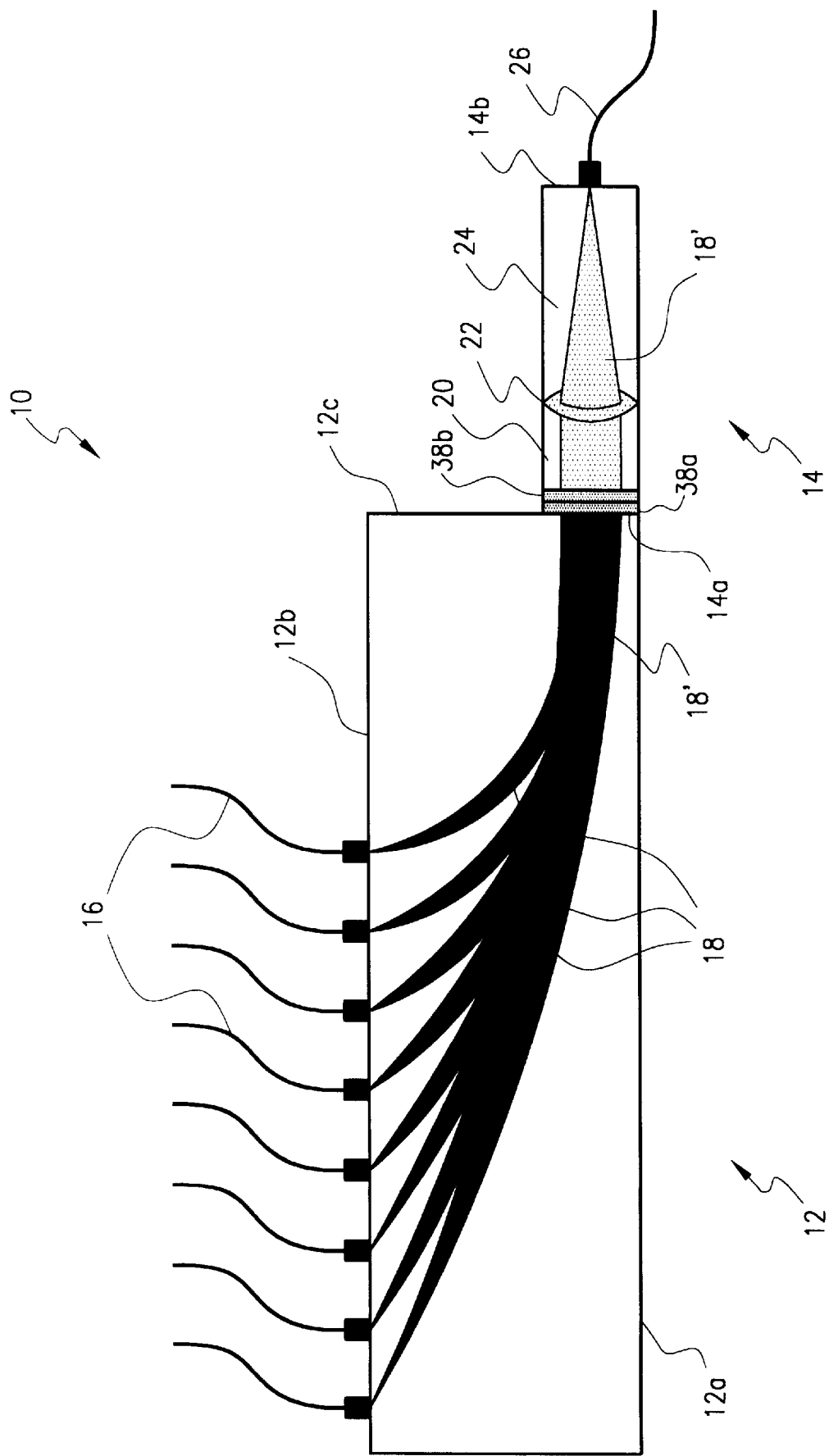
FIG. 9 is a view similar to that of the device of FIG. 1, but containing two electrooptical beamsteering elements between the dispersive element and the second homogeneous index boot lens and which are orthogonal to one another to enable a channel routing function by shifting the position of the output beam in two dimensions at the output face of the device.

In the tenth embodiment, shown in FIG. 9, two perpendicularly oriented nonlinear electrooptic elements 38a, 38b are inserted, again, between the first and second coupler elements 12 and 14, to provide a capability for selectively beamsteering the multiplexed light into one of several possible linear output fibers 26. The use of two orthogonal beamsteering elements allows shifting of the position of the output beam within a plane at the output face of the device. This is exceedingly valuable for optical networking, whereas the wavelength division multiplexer device 10 can provide simulteneous taneous integrated multiplexing (or demultiplexing) and routing functions.

Figure 10:
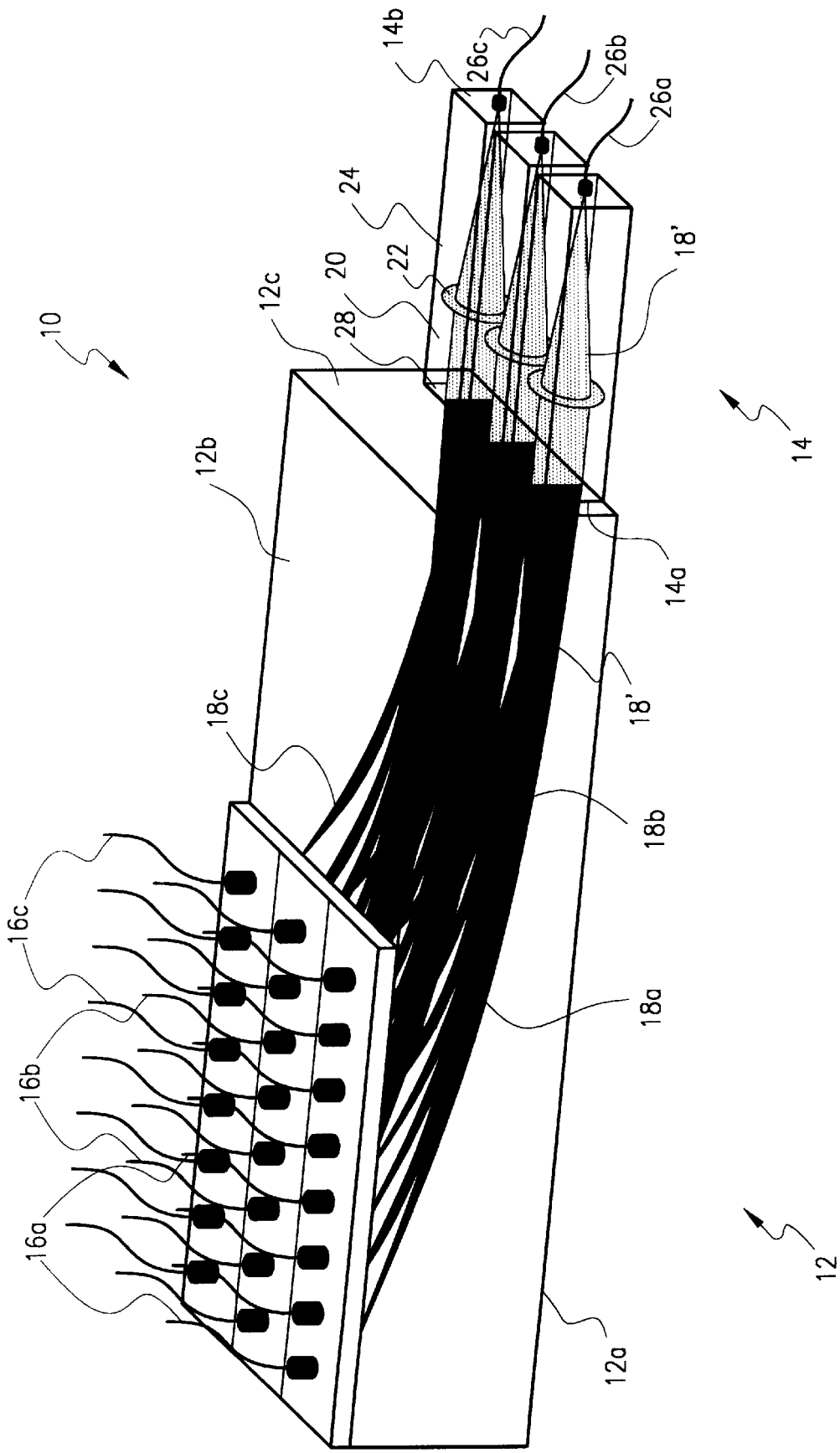
FIG. 10 is a perspective view of the device of FIG. 1, but including a plurality of independent one-dimensional arrays of input optical fibers, each array having an individual, operatively-associated second coupler element.

In the eleventh embodiment, shown in FIG. 10, the wavelength division multiplexer 10 is configured to input a plurality of one-dimensional arrays of input optical fibers 16. Three such one-dimensional arrays 16a, 16b, 16c are shown, beneath each of which is located a cylindrical gradient refractive index lens operatively associated with each input array. The purpose of this embodiment is to provide the ability to simultaneously multiplex multiple fiber arrays in parallel within one single multiplexer device. This embodiment saves cost and size, and integrates the function of several one-dimensional systems into one two-dimensional system. The inputs from each array 16a, 16b, 16c are separately multiplexed and directed to separate second coupler elements 14 and respective output fibers 26a, 26b, 26c. The refractive index gradient of the dispersive element 12 in this embodiment must be an axial gradient in order to properly deliver each multiplexed light beam 18' to the correct second coupler element 24.

Figure 11:
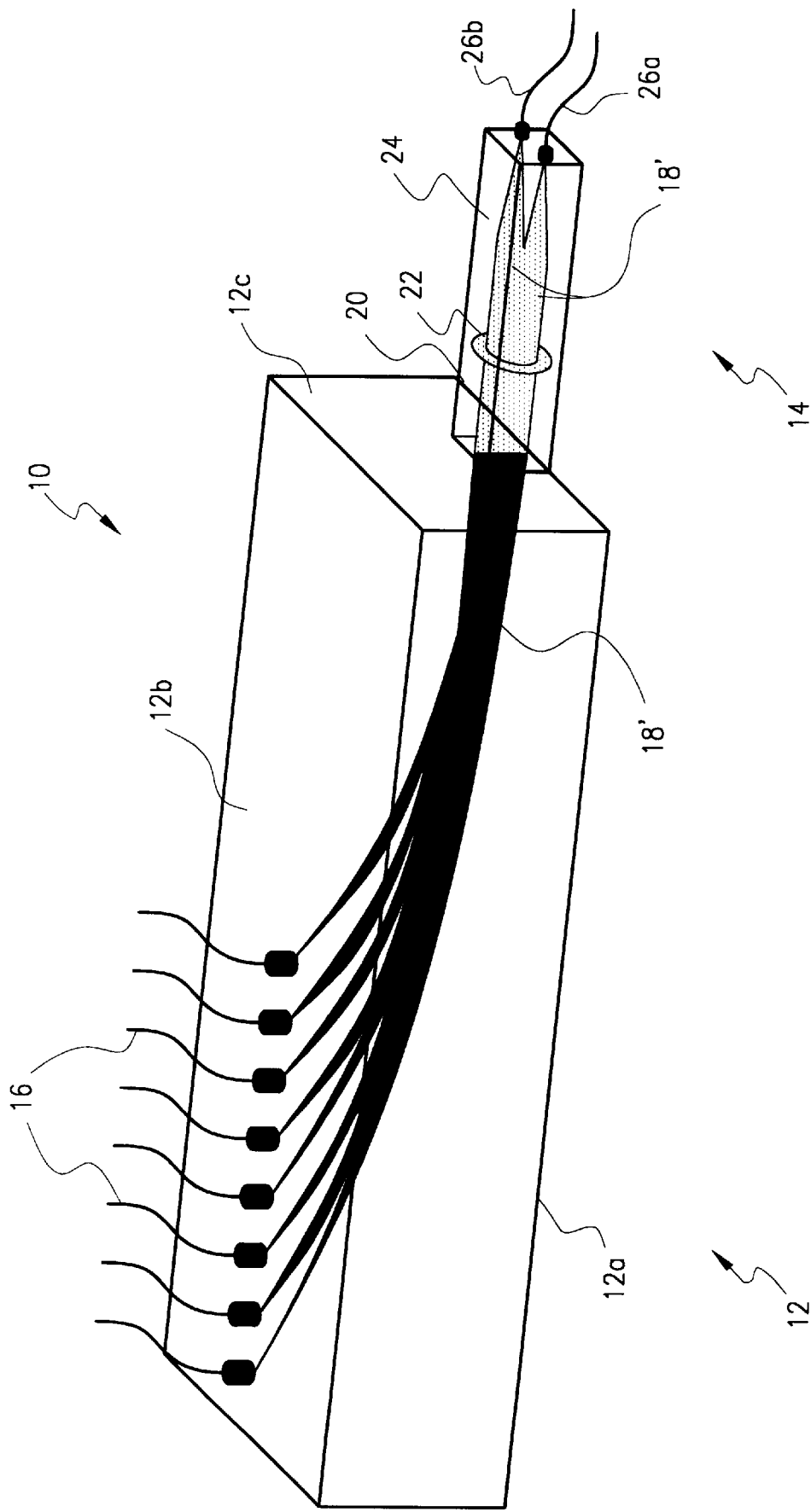
FIG. 11 is a perspective view of the device of FIG. 1, but including a single one-dimensional array of input optical fibers that are output to two or more single fibers perpendicular in direction to the one-dimensional input array.

In the twelfth embodiment, shown in FIG. 11, the wavelength division multiplexer is configured to input a one-dimensional array of optical fibers 16 and provide a single output at the output face 14b of the multiplexer that is shared by two or more output fibers 26a, 26b. One implementation of the current embodiment is to design the collimating lens assemblies, utilize astigmatic light inputs from laser diodes, or use an axial gradient refractive index in the first coupler element 12 such that two or more fibers receive the output light beam 18'.

Figure 12:
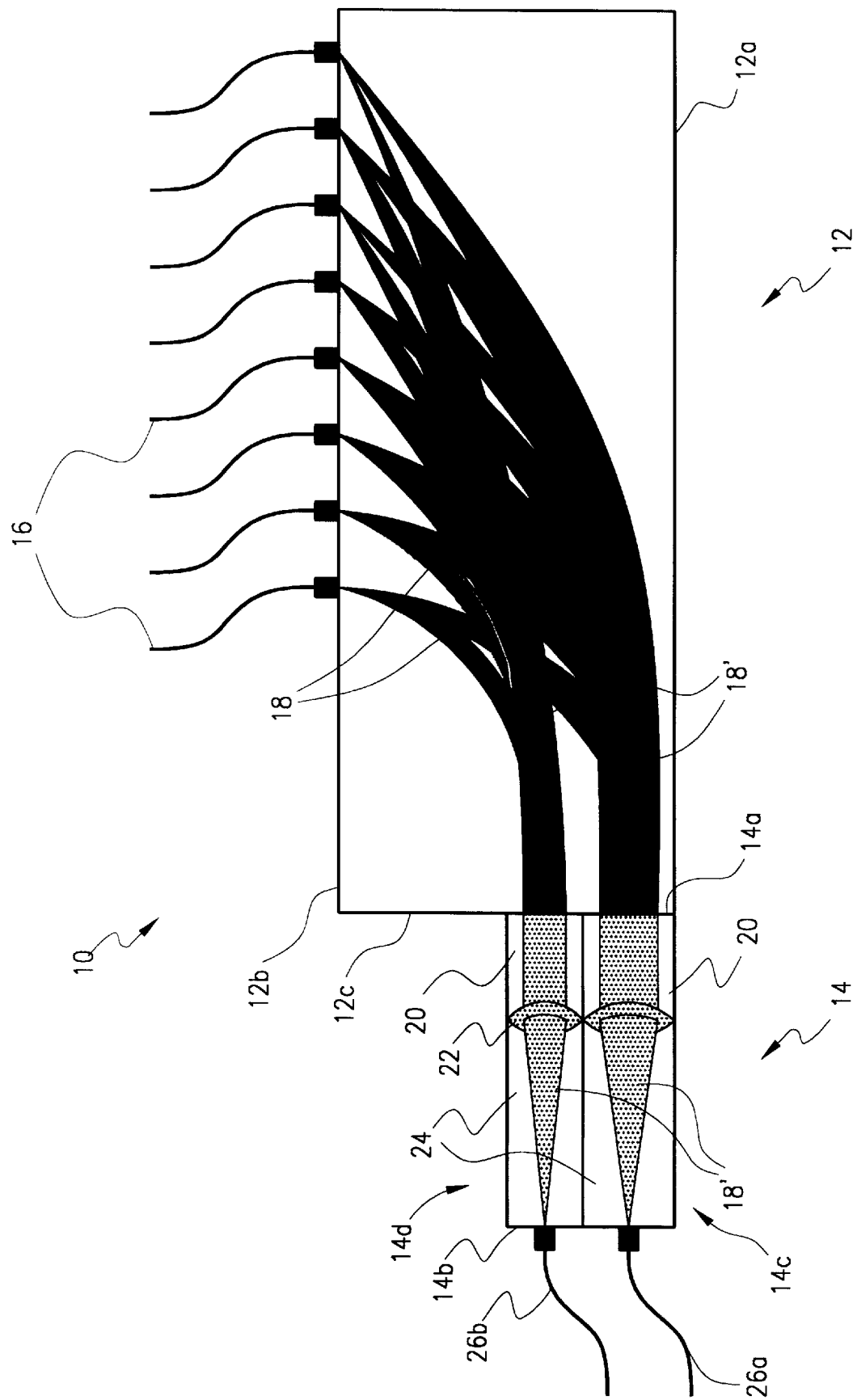
FIG. 12 is a view similar to that of the demultiplexer aspect of the device of FIG. 1, but having two input fibers, with each fiber having a separate second coupler element for simultaneously demultiplexing the two inputs to the same positions at the output face of the device, thereby providing a very valuable routing capability.

In the thirteenth embodiment, shown in FIG. 12, the wavelength division demultiplexer 10 includes two separate fiber inputs 26a, 26b, each of which is attached to a separate second coupler assembly 14c, 14d, respectively. The second coupler assemblies 14c, 14d are located one above the other, where the above, or up, direction is parallel to the fiber inputs and perpendicular to the input fiber array 16 of the first coupler element 12. The unique light focusing behavior of the first coupler element 12 allows any single wavelength to be focused at only one position at the exit face 12b of the first coupler element, regardless of the incident position on the side (entrance) face 12c of the first coupler element.

Figures 13A, 13B, 13C:
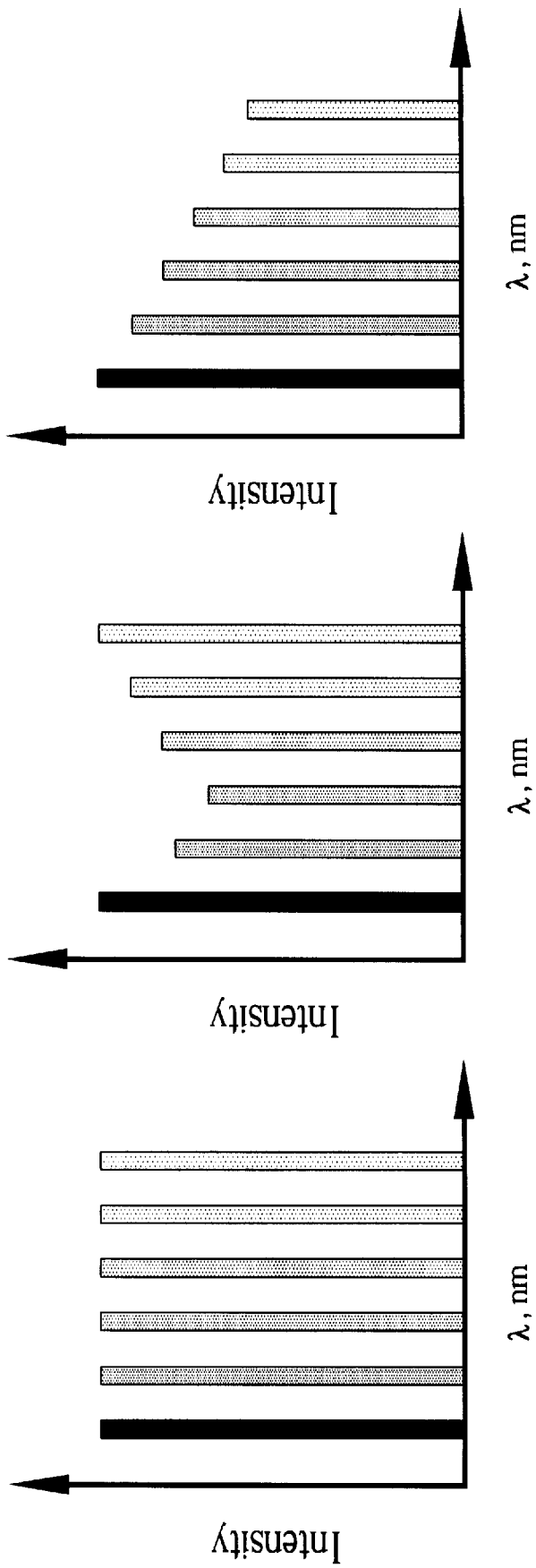
FIGS. 13a–13c are plots on coordinates of intensity and wavelength, depicting different intensity profiles for different configurations of the multiplexer of the present invention.

In the fourteenth embodiment, the device of FIG. 1 may be specially designed and constructed such that individual wavelength channels in the polychromatic output beam are unevenly focused at the output face of the multiplexer. As graphically shown in FIG. 13a, the preferential embodiment of the device of FIG. 1 creates a very uniform plurality of focused beams that have uniform intensity distributions. However, the current embodiment alters the design of the collimating lens assemblies in order to incorporate a variation in intensity distributions as a function of increasing wavelength, such as shown in FIGS. 13b and 13c. These variations need not be linear but may be fairly complex and non-linear to match the non-uniform gain profiles of optical amplifiers, laser diode arrays, or other devices.

In the fifteenth embodiment, shown in FIG. 14, the wavelength division multiplexer 10 is configured in its demultiplexer mode to input a 1-dimension array of optical fibers 26 and again output to one or more output fibers. The current embodiment incorporates a cylindrical gradient refractive index lens 40 in place of one of the homogeneous index boot lenses. As shown in FIG. 14, the second homogeneous index boot lens 24 is replaced with the cylindrical gradient refractive index lens 40 to provide slight focusing of the light beam 18' along an axis parallel to direction of the input array 26. The cylindrical gradient refractive index lens 40 provides focusing of the output to a greater degree along one axis and no effect along the perpendicular axis. This enables the multiplexed light beams to be normally focused along one axis while prematurely focused or de-focused the other axis for the purpose of creating an output beam 18' which is elongated along one axis.

Figure 14A:
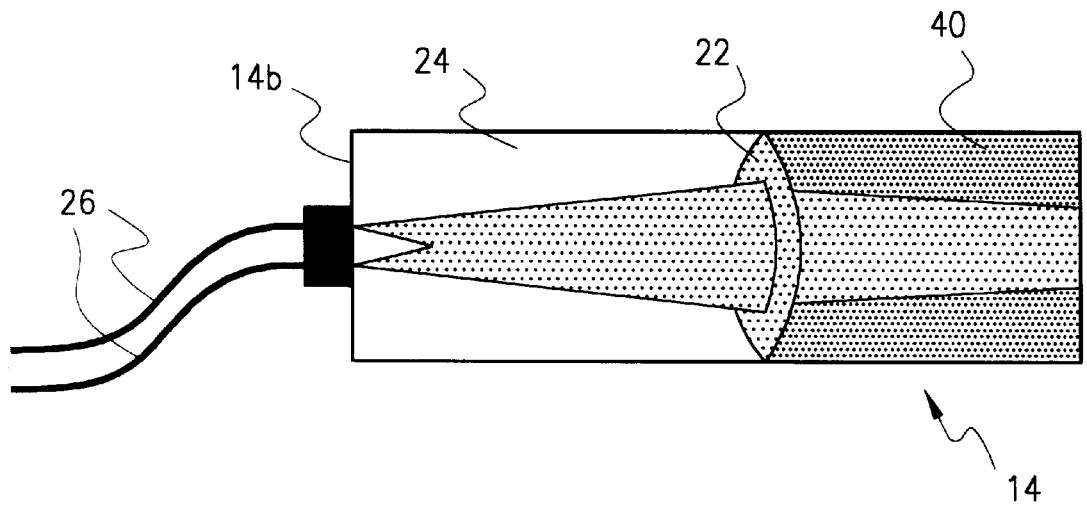
FIG. 14a–14c are top plan views of a portion of the demultiplexer aspect of the device of FIG. 1, but inserting a cylindrical gradient refractive index lens in place of the second homogeneous index boot lens, which preferentially focuses light along one axis.
Figure 14B:
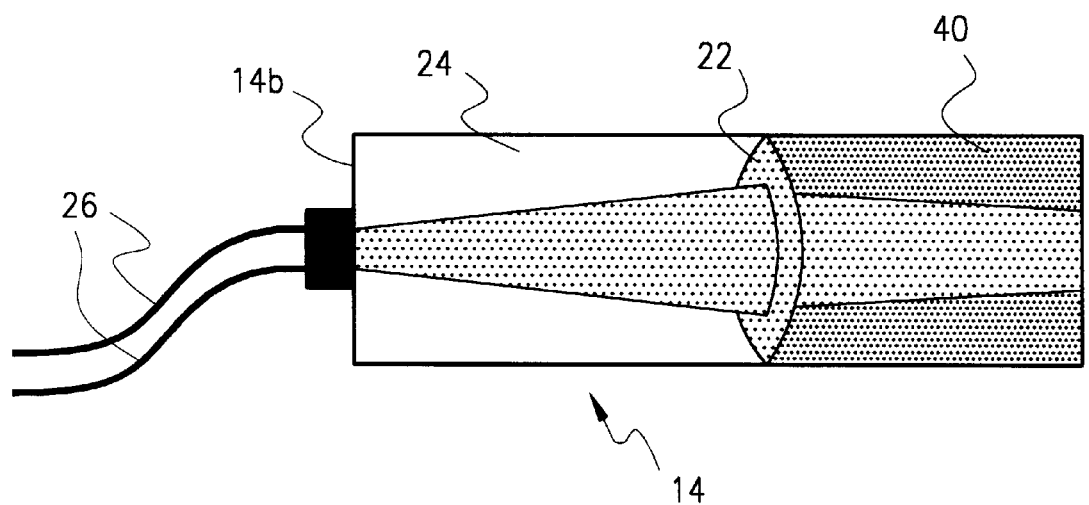

As shown in FIG. 14a, by appropriately tailoring the focusing properties of the cylindrical gradient refractive index lens 40, it is possible to create two identical spots of equal shape and energy intensity. Alternately, the output beam 18' may be simply elongated such that more than two output fibers receive relatively equal portions of the output beam, as shown in FIG. 14b.

Figure 14C:
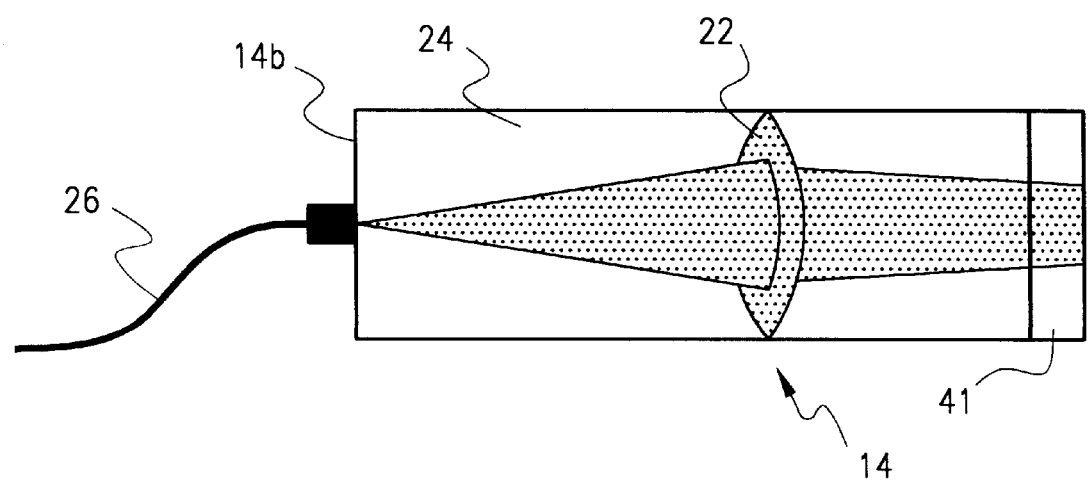

Further, an alternate embodiment would be to replace the function of the cylindrical gradient refractive index lens 40 by a non-gradient cylindrical lens, second diffractive lens, binary optic, or other microoptic 41 to provide preferential focusing along one axis of the device 10. As necessary, a homogeneous index boot lens 20 or an air space would be used to correctly separate and/or attach the alternate lens to the axial gradient refractive index collimating lens 22, as shown in FIG. 14c. The use of a cylindrical gradient refractive lens allows an axial refractive index gradient to be used in dispersive element 12.

Figure 15:
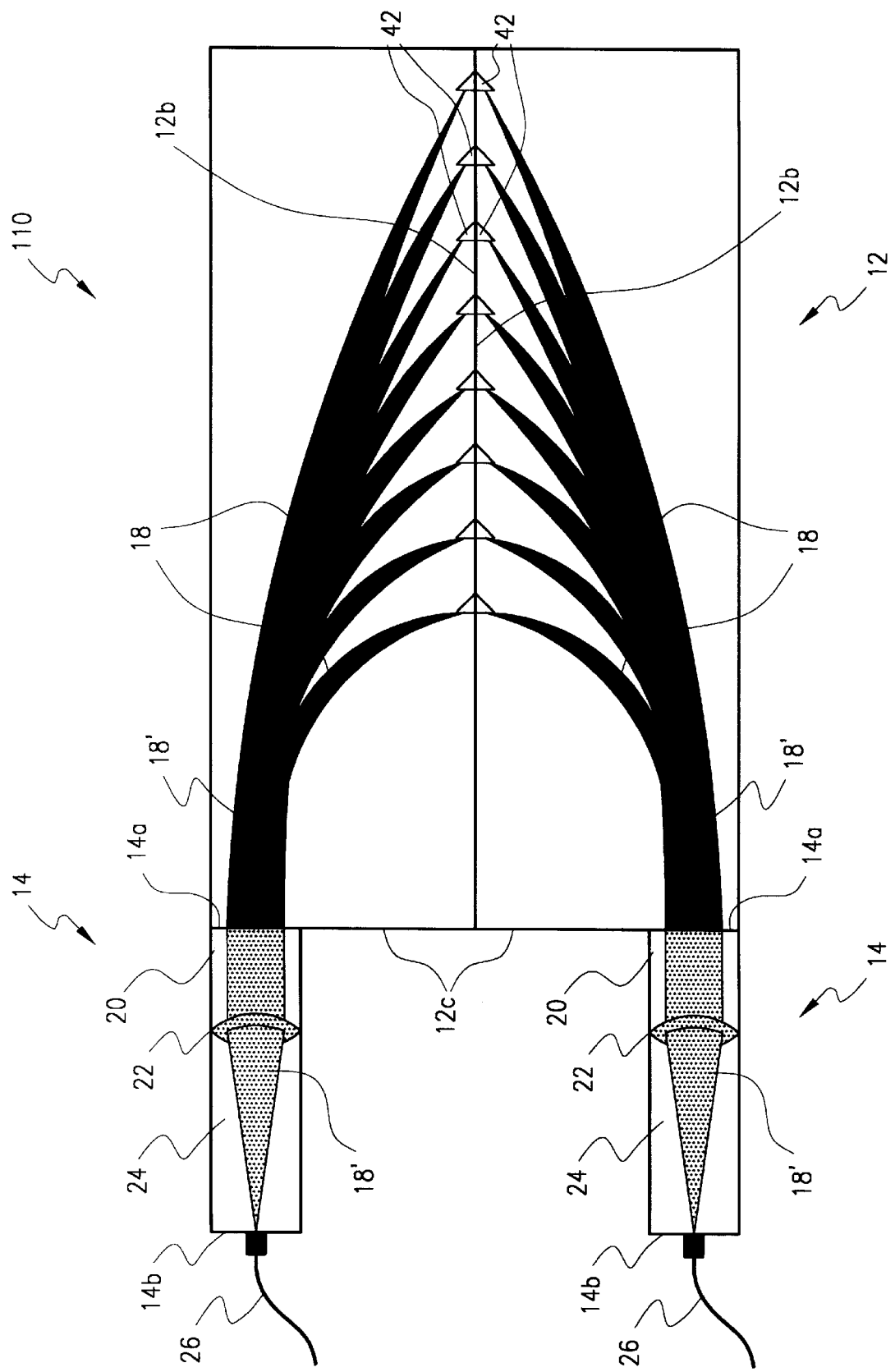
FIG. 15 is a view similar to that of the device of FIG. 2, except that two such devices are placed in contact at the high index of refraction faces of the dispersive elements, and in between the two faces is placed an array of optical switches or an array of electrooptical beamsteering material to provide blocking switch functions.

In the sixteenth embodiment, shown in FIG. 15, a customizable wavelength division router 110 may be created by placing two of the devices 10 shown in FIG. 2 together at their faces 12b. At the point where the two devices 10 are joined, an array of individually addressable electrooptic mirror elements 42 may be inserted to enable a blocking switch function for each individual wavelength channels.

Figure 16:
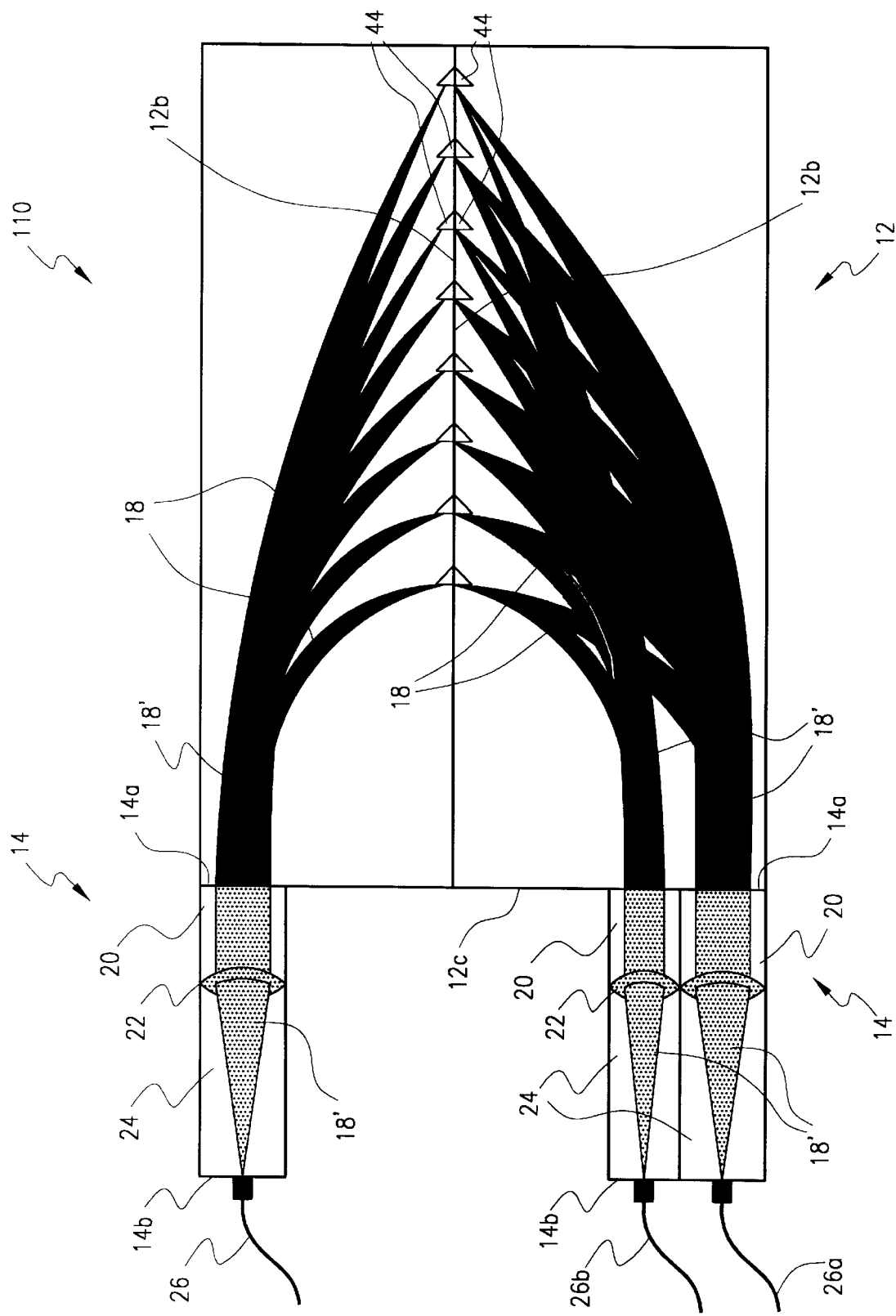
FIG. 16 is a view similar to that of FIG. 15, but contains an array of electrooptical beamsteering elements or moveable mirrors in place of the electrooptical switch array.

In the seventeenth embodiment, shown in FIG. 16, a customizable wavelength division router 110 may be created by replacing the electrooptical mirror, or switching array, 42 with an array of electrooptical beamsteering elements or moveable mirrors 44.

The beamsteering elements 44 allow each demultiplexed channel to be selectively routed to a specific second (output) coupler 14, 14'.

Figure 17:
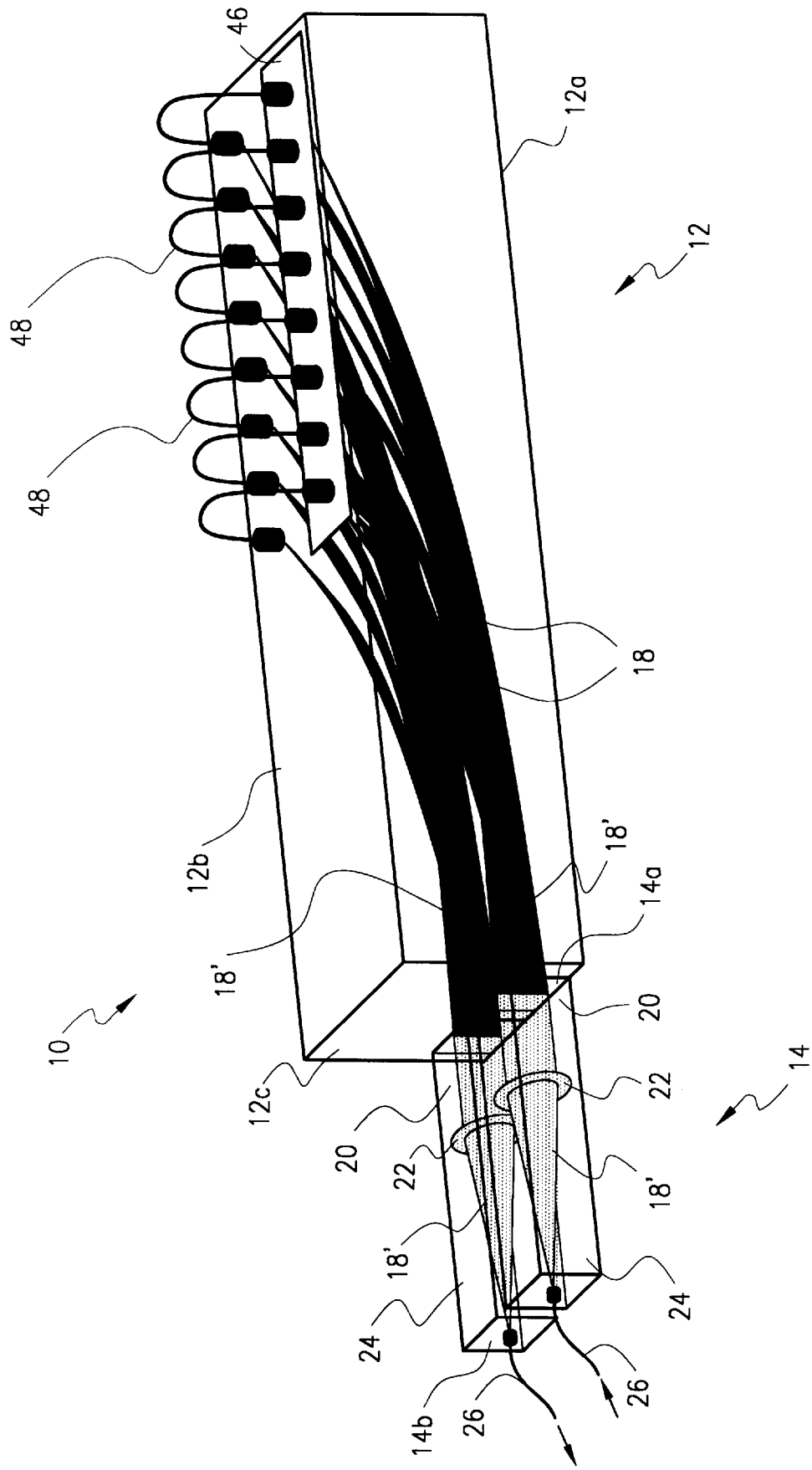
FIG. 17 is a view similar to that of FIG. 1, but is configured as a 1×N switch with optical fiber pigtails to take an input, demultiplex it, then switch and route it through a multiplexer on the same device to an output.

In the eighteenth embodiment, shown in FIG. 17, the wavelength division multiplexing device 10 of FIG. 1 is used to create a 1×N switch. The basic device 10 of FIG. 1 is first used as a demultiplexer to separate a plurality of wavelengths 18 that are present at the output face 12b of the device. Attached to the output face 12b is first an array of electrooptical blocking elements 46 that are individually addressable (one element for each wavelength). After the blocking array 46 is located either Porro-type reflective prisms (not shown) or fiber pigtails 48 which take the individual outputs and reroute them to separate positions on the same output face 12b as multiplexer inputs. The inputs then pass through the device 10, are multiplexed, and are then output on the first input face 14b. This device provides a switching function for each individual wavelength. An alternative embodiment would be to slightly bevel and mirror the output face (not shown). A small bevel angle (less than 3°) is used to return the demultiplexed optical signals back into the device for multiplexing. In this embodiment, it is preferable to incorporate an axial refractive index gradient in dispersive element 12. Alternatively, two identical dispersive elements 10, both containing radial refractive index gradients, may be used.

Figure 18:
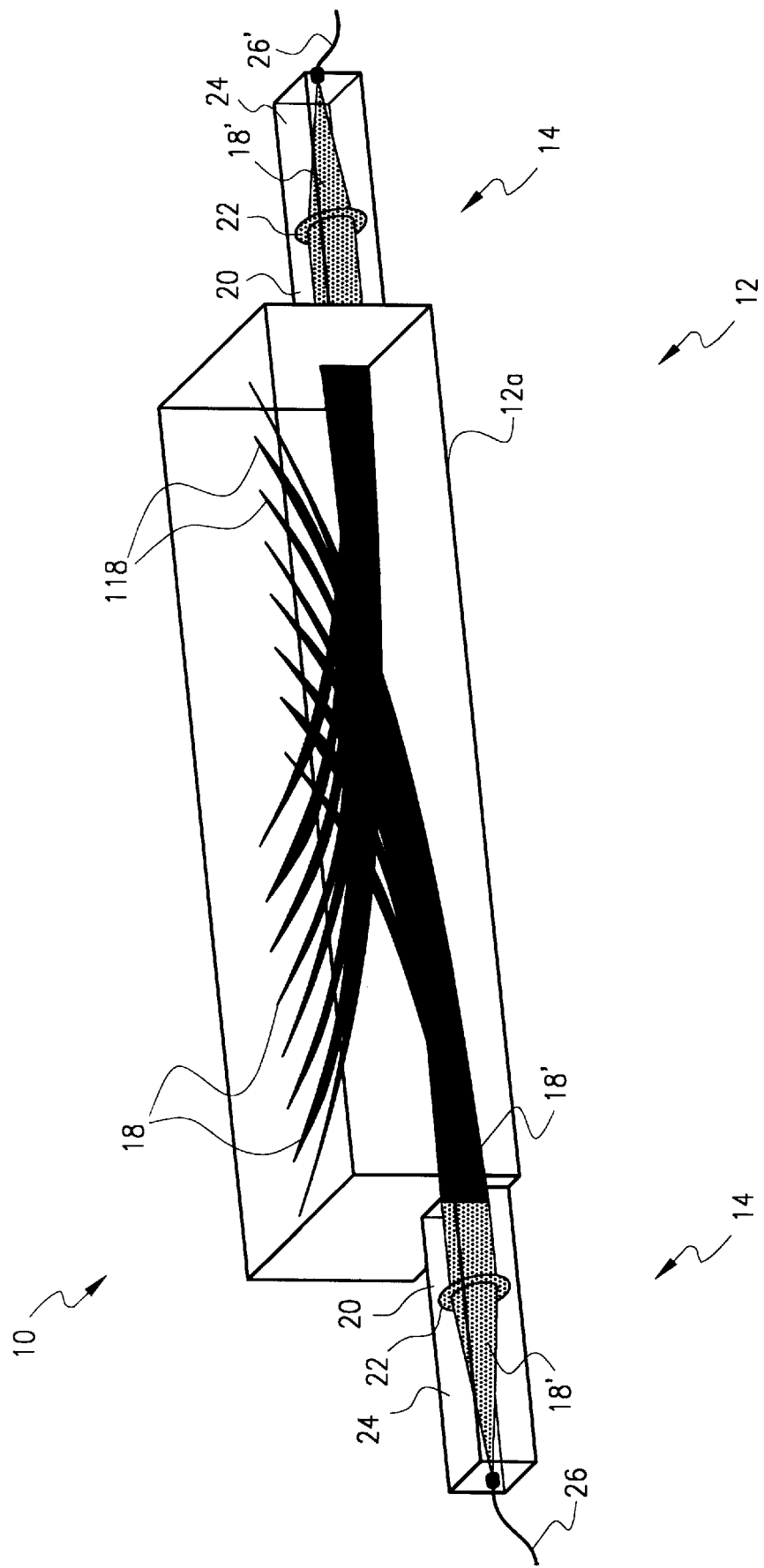
FIG. 18 is a view similar to that of FIG. 1, but contains two multiplexers, both of which share the same first coupler element, but separate second coupler elements placed on opposite sides of the first coupler element.

In the nineteenth embodiment, shown in FIG. 18, a dual multiplexer system may be developed by using a single first coupler element 12 with an axial refractive index gradient and multiple second coupler elements 14, 14'. The multiplexer input arrays (not shown) must be appropriately separated from other input arrays to prevent overlap of the inputs. As shown in FIG. 18, two input arrays are spaced apart and light beams 18, 118 are separate and have their respective second coupler elements 14, 14' located on opposite sides of the first coupler element 12.

It is conceivable that more than two multiplexers can be created by using the same first coupler element 12 by extending the depth of the element. Further, it is possible to use all four sides of the first coupler element for additional second coupler elements, provided the input arrays are appropriately separated. By using multiple multiplexers in the demultiplexer configuration, any number of custom routing patterns can be created by appropriately routing fibers from one demultiplexer output port to the output port of a different multiplexer of the same wavelength.

INDUSTRIAL APPLICABILITY

The integrated axial and radial gradient refractive index wavelength division multiplexer/demultiplexer of the present invention is expected to find broad application in WDM-based network and communication systems.

Thus, there has been disclosed an integrated axial and radial gradient refractive index wavelength division multiplexer and demultiplexer. It will be readily apparent to those skilled in this art that various changes and modifications of an obvious nature may be made, and all such changes and modifications are considered to fall within the scope of the present invention, as defined by the appended claims.

What is claimed is:

1. An integrated gradient refractive index wavelength division multiplexer device comprising:
    (a) means for accepting a plurality of optical beams of different wavelengths from a plurality of optical sources, said means including a planar front surface onto which said plurality of optical beams are incident;
    (b) a dispersive element comprising a gradient refractive index for combining said plurality of optical beams into at least one multiplexed, polychromatic optical beam and operatively associated with said planar front surface;
    (c) a coupler subsystem affixed to said dispersive element and comprising (1) a homogeneous index boot lens having a planar front surface onto which said at least one multiplexed, polychromatic optical beam from said dispersive element is incident, (2) an axial gradient refractive index collimating lens affixed to said homogeneous index boot lens, and (3) a planar back surface from which said at least one multiplexed, polychromatic optical beam exits, operatively associated with said axial gradient refractive index collimating lens; and
    (d) means for outputting said at least one multiplexed, polychromatic optical beam to an optical receiver, said means including said planar back surface.

2. The device of claim 1 wherein said plurality of optical sources are selected from the group consisting of optical fibers, lasers, and laser diodes.

3. The device of claim 2 wherein said plurality of optical sources comprise at least one optical fiber transmitting a plurality of wavelengths.

4. The device of claim 2 wherein said plurality of optical sources comprise a one-dimensional array of optical fibers.

5. The device of claim 2 wherein said plurality of optical sources comprise a two-dimensional array of optical fibers.

6. The device of claim 2 wherein said plurality of optical sources comprise a one-dimensional array of laser diodes.

7. The device of claim 2 wherein said plurality of optical sources comprise a two-dimensional array of laser diodes.

8. The device of claim 1 wherein said optical receiver is selected from the group consisting of optical fibers and photodetectors.

9. The device of claim 8 wherein said optical receiver comprises a one-dimensional array of optical fibers.

10. The device of claim 8 wherein said optical receiver comprises a two-dimensional array of optical fibers.

11. The device of claim 8 wherein said optical receiver comprises a one-dimensional array of photodetectors.

12. The device of claim 8 wherein said optical receiver comprises a two-dimensional array of photodetectors.

13. The device of claim 1 wherein said planar front surface that is operatively associated with said dispersive element is provided with a plurality of notches, each of which is associated with one of said plurality of optical sources, in order to deflect corresponding ones of said plurality of optical beams toward said coupler subsystem.

14. The device of claim 13 wherein said planar front surface that is operatively associated with said dispersive element is a first planar front surface that is operatively associated with a first dispersive element, further comprising a second dispersive element operatively associated with a second planar front surface having a plurality of notches, wherein said first and second dispersive elements are joined along their respective planar front surfaces such that each said notch in said first planar front surface aligns with a corresponding notch in said second planar front surface.

15. The device of claim 14 wherein each notch is provided with a controllable mirror for switching/routing functions.

16. The device of claim 14 wherein said coupler subsystem is a first coupler subsystem, further comprising a second coupler subsystem wherein each notch is provided with an electrooptic element for selectively steering a beam from said first coupler subsystem to said second coupler subsystem, and vice versa.

17. The device of claim 1 further comprising at least one electrooptical element for refracting the plurality of wavelengths in said at least one multiplexed, polychromatic optical beam to provide channel routing capabilities.

18. The device of claim 17 wherein said at least one electrooptical element is a non-linear electrooptic element between said dispersive element and said coupler subsystem.

19. The device of claim 18 further comprising two electrooptical elements between said dispersive element and said coupler subsystem, one of said electrooptical elements being orthogonal to the other.

20. The device of claim 1 wherein said at least one multiplexed, polychromatic optical beam is at least one multiplexed, polychromatic optical output beam, wherein said plurality of optical beams of different wavelengths is a plurality of optical input beams of different wavelengths, wherein said means for outputting said at least one multiplexed, polychromatic optical output beam comprises means for accepting at least one multiplexed, polychromatic optical input beam, wherein said dispersive element serves to separate said at least one multiplexed, polychromatic optical input beam into a plurality of output beams, each of a different wavelength, and wherein said means for accepting a plurality of optical input beams of different wavelengths comprises means for outputting said plurality of output beams to a corresponding plurality of optical receivers, whereby said device acts as a demultiplexer.

21. The device of claim 20 wherein said means for accepting at least one multiplexed, polychromatic optical input beam is a first means for accepting at least one multiplexed, polychromatic optical input beam, further comprising a second means for accepting at least one multiplexed, polychromatic optical input beam and a one-dimensional array of outputs for outputting a plurality of output beams separated from at least one of said at least one multiplexed, polychromatic optical input beam accepted by said first and second means for accepting.

22. The device of claim 1 further comprising a cylindrical gradient refractive index lens between said plurality of optical sources and said dispersive element.

23. The device of claim 1 wherein said planar front surface that is operatively associated with said dispersive element is provided with a plurality of microlenses, each of which is associated with one of said plurality of optical sources; for directing and focusing corresponding ones of said plurality of optical beams toward said coupler subsystem.

24. The device of claim 1 wherein said planar front surface that is operatively associated with said dispersive element is provided with a cylindrical gradient refractive index lens.

25. The device of claim 1 wherein said homogeneous index boot lens is provided with a −45° mirrored bevel to create a compact, "L" shaped device.

26. The device of claim 1 wherein a wall of said dispersive element, opposite a wall to which said coupler subsystem is affixed to said dispersive element, is mirrored in order to reduce the length of said dispersive element.

27. The device of claim 1 wherein said homogeneous index boot lens is a first homogeneous index boot lens, further comprising a second homogeneous index boot lens between said axial gradient refractive index collimating lens and said means for outputting.

28. The device of claim 1 wherein said dispersive element has a radial gradient centered along said planar front surface, with a higher index of refraction corresponding to an optical axis of said dispersive element, said optical axis of said dispersive element parallel and in-line with an optical axis of said coupler subsystem.

29. The device of claim 1 wherein said dispersive element has an axial gradient passing from said planar front surface having a higher index of refraction to a second and opposite surface having a lower index of refraction and wherein said coupler subsystem is affixed to said dispersive element in the vicinity of said lower index of refraction.

30. The device of claim 1 wherein said coupler subsystem is a first coupler subsystem, further comprising a second coupler subsystem wherein said first and second coupler subsystems are spaced laterally, with said first coupler subsystem transmitting an input beam of multiplexed, polychromatic light and said second coupler subsystem transmitting an output beam of multiplexed, polychromatic light, wherein a first portion of said planar front surface that is operatively associated with said dispersive element, and associated with said input beam, is provided with an array of electrooptical blocking elements, which are optically connected to a second portion of said planar front surface that is operatively associated with said dispersive element, and associated with said output beam, for separately switching individual wavelengths of said input beam to said output beam.

31. The device of claim 1 wherein said coupler subsystem is a first coupler subsystem, further comprising a second coupler subsystem, said first and second coupler subsystems disposed on opposite surfaces of said dispersive element, wherein said first and second coupler subsystems are each configured to accept a multiplexed output beam from a separate plurality of discrete wavelengths.

32. The device of claim 1 wherein said coupler subsystem provides a specifically desired function for channel output intensity as a function of wavelength.

33. A dispersive element for multiplexing a plurality of monochromatic optical beams into at least one polychromatic optical beam, the dispersive element comprising a substantially planar top surface for receiving the plurality of monochromatic optical beams, a substantially planar side surface for transmitting the at least one polychromatic optical beam, and a bottom surface substantially opposite the top surface, the dispersive element further comprising a refractive index gradient traversing from a high refractive index at the top surface to a low refractive index at the bottom surface for combining the plurality of monochromatic optical beams into the at least one polychromatic optical beam.

34. The dispersive element of claim 33 wherein the at least one polychromatic optical beam is at least one collimated polychromatic optical beam.

35. The dispersive element of claim 33 wherein the refractive index gradient is an axial refractive index gradient.

36. The dispersive element of claim 33 wherein the refractive index gradient is a radial refractive index gradient.

37. The dispersive element of claim 33 wherein the top surface has a plurality of notches formed therein for directing the plurality of monochromatic optical beams.

38. The dispersive element of claim 33 wherein the dispersive element further comprises a mirrored surface for reflecting the plurality of monochromatic optical beams.

39. A dispersive element for demultiplexing at least one polychromatic optical beam into a plurality of monochromatic optical beams, the dispersive element comprising a substantially planar side surface for receiving the at least one polychromatic optical beam, a substantially planar top surface for transmitting the plurality of monochromatic optical beams, and a bottom surface substantially opposite the top surface, the dispersive element further comprising a refractive index gradient traversing from a high refractive index at the top surface to a low refractive index at the bottom surface for separating the at least one polychromatic optical beam into the plurality of monochromatic optical beams.

40. The dispersive element of claim 39 wherein the at least one polychromatic optical beam is at least one collimated polychromatic optical beam.

41. The dispersive element of claim 39 wherein the refractive index gradient is an axial refractive index gradient.

42. The dispersive element of claim 39 wherein the refractive index gradient is a radial refractive index gradient.

43. The dispersive element of claim 39 wherein the top surface has a plurality of notches formed therein for directing the plurality of monochromatic optical beams.

44. The dispersive element of claim 39 wherein the dispersive element further comprises a mirrored surface for reflecting the plurality of monochromatic optical beams.

45. An integrated gradient refractive index wavelength division multiplexer device comprising:

(a) a dispersive element having a gradient refractive index for combining a plurality of monochromatic optical beams into a multiplexed, polychromatic optical beam;

(b) a homogeneous index boot lens affixed to the dispersive element for transmitting the multiplexed, polychromatic optical beam from the dispersive element; and (c) an axial gradient refractive index collimating/focusing lens affixed to the homogeneous index boot lens for focusing the multiplexed, polychromatic optical beam.

46. The device of claim 45 wherein the dispersive element combines the plurality of monochromatic optical beams into a collimated, multiplexed, polychromatic optical beam.

47. The device of claim 45 wherein the gradient refractive index is an axial gradient refractive index.

48. The device of claim 45 wherein the gradient refractive index is a radial gradient refractive index.

49. An integrated gradient refractive index wavelength division demultiplexer device comprising:

(a) an axial gradient refractive index collimating/focusing lens for collimating a multiplexed, polychromatic optical beam;

(b) a homogeneous index boot lens affixed to the axial gradient refractive index collimating/focusing lens for transmitting the collimated, multiplexed, polychromatic optical beam from the axial gradient refractive index collimating/focusing lens; and (c) a dispersive element affixed to the homogeneous index boot lens and having a gradient refractive index for separating the collimated, multiplexed, polychromatic optical beam into a plurality of monochromatic optical beams.

50. The device of claim 49 wherein the gradient refractive index is an axial gradient refractive index.

51. The device of claim 49 wherein the gradient refractive index is a radial gradient refractive index.

* * * * *

UNITED STATES PATENT AND TRADEMARK OFFICE
CERTIFICATE OF CORRECTION

PATENT NO. : 6,011,885
DATED : January 4, 2000
INVENTOR(S) : Joseph R. Dempewolf et al.

Page 1 of 5

It is certified that error appears in the above-identified patent and that said Letters Patent is hereby corrected as shown below:

Column 3,
Line 43, after "is" insert -- in --.

Column 9,
Line 13, replace "of" with -- or --
Line 67, after "multiplexer" insert -- 10 --.

Column 10,
Line 13, replace "14c, 14d" with -- 14a, 14b --.

Please replace Claim 2-22 and 27-29 with the correct Claims on the attached sheets.

2. The device of Claim 1 wherein said at least one multiplexed, polychromatic optical beam is at least one multiplexed, polychromatic optical output beam, wherein said plurality of optical beams of different wavelengths is a plurality of optical input beams of different wavelenghts, wherein said means for outputting said at least one multiplexed, polychromatic optical output beam comprises means for accepting at least one multiplexed, polychromatic optical input beam, wherein said dispersive element serves to separate said at least one multiplexed, polychromatic optical input beam into a plurality of output beams, each of a different wavelength, and wherein said means for accepting a plurality of optical input beams of different wavelengths comprises means for outputting said plurality of output beams to a corresponding plurality of optical receivers, whereby said device acts as a demultiplexer.

3. The device of Claim 2 wherein said means for accepting at least one mulitplexed, polychromatic optical input beam is a first means for accepting at least one multiplexed, polychromatic optical input beam, further comprising a second means for accepting at least one multiplexed, polychromatic optical input beam and a one-dimensional array of outputs for outputting a plurality of output beams separated from at least one of said at least one

UNITED STATES PATENT AND TRADEMARK OFFICE
CERTIFICATE OF CORRECTION

PATENT NO. : 6,011,885
DATED : January 4, 2000
INVENTOR(S) : Joseph R. Dempewolf et al.

It is certified that error appears in the above-identified patent and that said Letters Patent is hereby corrected as shown below:

multiplexed, polychromatic optical input beam accepted by said first and second means for accepting.

4. The device of Claim 1 further comprising a cylindrical gradient refractive index lens between said plurality of optical sources and said dispersive element.

5. The device of Claim 1 wherein said homogeneous index boot lens is a first homogeneous index boot lens, further comprising a second homogeneous index boot lens between said axial gradient refractive index collimating lens and said means for outputting.

6. The device of Claim 1 wherein said dispersive element has a radial gradient centered along said planar front surface, with a higher index of refraction corresponding to an optical axis of said dispersive element, said optical axis of said dispersive element parallel and in-line with an optical axis of said coupler subsystem.

7. The device of Claim 1 wherein said dispersive element has an axial gradient passing from said planar front surface having a higher index of refraction to a second and opposite surface having a lower index of refraction and wherein said coupler subsystem is affixed to said dispersive element in the vicinity of said lower index of refraction.

8. The device of Claim 1 wherein said plurality of optical sources are selected from the group consisting of optical fibers, lasers, and laser diodes.

9. The device of Claim 8 wherein said plurality of optical sources comprise at least one optical fiber transmitting a plurality of wavelengths.

UNITED STATES PATENT AND TRADEMARK OFFICE
CERTIFICATE OF CORRECTION

PATENT NO. : 6,011,885
DATED : January 4, 2000
INVENTOR(S) : Joseph R. Dempewolf et al.

It is certified that error appears in the above-identified patent and that said Letters Patent is hereby corrected as shown below:

10. The device of Claim 8 wherein said plurality of optical sources comprise a one-dimensional array of optical fibers.

11. The device of Claim 8 wherein said plurality of optical sources comprise a two-dimensional array of optical fibers.

12. The device of Claim 8 wherein said plurality of optical sources comprise a one-dimensional array of laser diodes.

13. The device of Claim 8 wherein said plurality of optical sources comprise a two-dimensional array of laser diodes.

14. The device of Claim 1 wherein said optical receiver is selected from the group consisting of optical fibers and protodetectors.

15. The device of Claim 14 wherein said optical receiver comprises a one-dimensional array of optical fibers.

16. The device of Claim 14 wherein said optical receiver comprises a two-dimensional array of optical fibers.

17. The device of Claim 14 wherein said optical receiver comprises a one-dimensional array of photodetectors.

18. The device of Claim 14 wherein said optical receiver comprises a two-dimensinal array of photodetectors.

UNITED STATES PATENT AND TRADEMARK OFFICE
CERTIFICATE OF CORRECTION

PATENT NO. : 6,011,885
DATED : January 4, 2000
INVENTOR(S) : Joseph R. Dempewolf et al.

It is certified that error appears in the above-identified patent and that said Letters Patent is hereby corrected as shown below:

19. The device of Claim 1 wherein said planar front surface that is operatively associated with said dispersive element is provided with a plurality of notches, each of which is associated with one of said plurality of optical sources, in order to deflect corresponding ones of said plurality of optical beams toward said coupler subsystem.

20. The device of Claim 19 wherein said plunar front surface that is operatively associated with said dispersive element is a first planar front surface that is operatively associated with a first dispersive element, further comprising a second dspersive element operatively associated with a second planar front surface having a plurality of notches, wherein said first and second dispersive elements are joined along their respective planar front surfaces such that each said notch in said first planar front surface aligns with a corresponding notch in said second planar fornt surface.

21. The device of Claim 20 wherein each notch is provided with a controllable mirror for switching/routing functions.

22. The device of Claim 20 wherein said coupler subsystem is a first coupler subsystem, further comprising a second coupler subsystem wherein each notch is provided with an electrooptic element for selectively steering a beam from said first coupler subsystem to said second coupler subsystem, and vice versa.

27. The device of Claim 1 further comprising at least one electrooptical element for refracting the plurality of wavelengths in said at least one multiplexed, polychromatic optical beam to provide channel routing capabilities.

UNITED STATES PATENT AND TRADEMARK OFFICE
CERTIFICATE OF CORRECTION

PATENT NO. : 6,011,885
DATED : January 4, 2000
INVENTOR(S) : Joseph R. Dempewolf et al.

It is certified that error appears in the above-identified patent and that said Letters Patent is hereby corrected as shown below:

28. The device of Claim 27 wherein said at least one electrooptical element is a non-linear electrooptic element between said dispersive element and said coupler subsystem.

29. The device of Claim 28 further comprising two electrooptical elements between said dispersive element and said coupler subsystem, one of said electrooptical elements being orthogonal to the other.

Signed and Sealed this

Twenty-seventh of November, 2001

Attest:

*Nicholas P. Godici*

*Attesting Officer*

NICHOLAS P. GODICI
*Acting Director of the United States Patent and Trademark Office*